United States Patent
Snider et al.

(10) Patent No.: US 12,545,084 B2
(45) Date of Patent: Feb. 10, 2026

(54) VEHICULAR REAR SLIDER WINDOW ASSEMBLY WITH SLIDER BEARING TRACK

(71) Applicant: Magna Exteriors, Inc., Troy, MI (US)

(72) Inventors: Darin J. Snider, Holland, MI (US); David K. Johnson, Holland, MI (US)

(73) Assignee: Magna Exteriors, Inc., Troy, MI (US)

( * ) Notice: Subject to any disclaimer, the term of this patent is extended or adjusted under 35 U.S.C. 154(b) by 0 days.

(21) Appl. No.: 18/775,303

(22) Filed: Jul. 17, 2024

(65) Prior Publication Data

US 2025/0026184 A1    Jan. 23, 2025

Related U.S. Application Data

(60) Provisional application No. 63/514,877, filed on Jul. 21, 2023.

(51) Int. Cl.
  *B60J 1/18* (2006.01)
  *E05D 15/06* (2006.01)

(52) U.S. Cl.
  CPC ........ *B60J 1/1853* (2013.01); *E05D 15/0647* (2013.01); *E05D 15/0682* (2013.01); *E05Y 2900/55* (2013.01)

(58) Field of Classification Search
  CPC ... B60J 1/1853; B60J 1/1861; E05D 15/0647; E05D 15/0682
  See application file for complete search history.

(56) References Cited

U.S. PATENT DOCUMENTS

| | | | |
|---|---|---|---|
| 6,018,913 A | 2/2000 | Lin | |
| 6,021,605 A | 2/2000 | Laux et al. | |
| 6,026,611 A | 2/2000 | Ralston et al. | |
| 6,038,819 A | 3/2000 | Klein | |
| 6,112,462 A | 9/2000 | Kolar | |
| 6,119,401 A * | 9/2000 | Lin | E05F 11/535 49/118 |
| 6,119,402 A | 9/2000 | Wisner | |
| 6,560,929 B1 | 5/2003 | Staser et al. | |
| 6,591,552 B1 | 7/2003 | Rasmussen | |
| 6,691,464 B2 | 2/2004 | Nestell et al. | |
| 6,810,622 B2 | 11/2004 | Oberheide | |
| 6,918,208 B2 | 7/2005 | Oberheide et al. | |
| 7,003,916 B2 | 2/2006 | Nestell et al. | |
| 7,073,293 B2 | 7/2006 | Galer | |
| 7,185,943 B2 | 3/2007 | Lesle et al. | |

(Continued)

*Primary Examiner* — Marcus Menezes
(74) *Attorney, Agent, or Firm* — HONIGMAN LLP

(57) ABSTRACT

A vehicular rear slider window assembly includes a fixed window panel, a movable window panel, a frame portion fixed relative to the fixed window panel, and an opening through the fixed window panel. The movable window panel is movable along upper and lower rails of the frame portion between closed and opened positions. A slider bearing system includes a guide element disposed at least partially along the lower rail and a carriage disposed at a lower perimeter region of the movable window panel. The guide element includes a bearing element that is slidably and non-rotatably received at a bearing receiving portion of the carriage. The carriage moves in a direction parallel to a longitudinal axis of the bearing element when the movable window panel moves between the closed position and the opened position.

17 Claims, 30 Drawing Sheets

(56) References Cited

U.S. PATENT DOCUMENTS

| | | |
|---|---|---|
| 7,410,201 B1 | 8/2008 | Wilson et al. |
| 7,584,574 B2 | 9/2009 | Kinross et al. |
| 7,861,462 B2 | 1/2011 | Smith et al. |
| 8,151,519 B2 | 4/2012 | Bello et al. |
| 8,240,087 B2 | 8/2012 | Kinross |
| 8,402,695 B2 | 3/2013 | Smith et al. |
| 8,474,186 B2 | 7/2013 | Dufour et al. |
| 8,510,993 B2 | 8/2013 | Mellary et al. |
| 8,595,981 B2 * | 12/2013 | Lahnala ............... B60J 1/1853 49/413 |
| 8,813,425 B2 | 8/2014 | Ash, Jr. et al. |
| 8,881,458 B2 | 11/2014 | Snider et al. |
| 8,915,018 B2 | 12/2014 | Snider |
| 8,935,887 B2 | 1/2015 | Cavalcante |
| 8,938,914 B2 | 1/2015 | Hulst et al. |
| 9,160,220 B2 | 10/2015 | Cavalcante |
| 9,518,420 B2 | 12/2016 | Kondo |
| 9,579,955 B2 | 2/2017 | Snider |
| 9,579,956 B2 | 2/2017 | Sudou et al. |
| 10,501,977 B2 | 12/2019 | Snider et al. |
| 10,524,313 B2 | 12/2019 | Snider et al. |
| 11,331,984 B2 | 5/2022 | Gustafson |
| 11,952,820 B1 | 4/2024 | Snider et al. |
| 2006/0080893 A1 | 4/2006 | Lesle et al. |
| 2006/0107600 A1 | 5/2006 | Nestell et al. |
| 2007/0234644 A1 | 10/2007 | Jaeger et al. |
| 2008/0127563 A1 | 6/2008 | Tooker |
| 2008/0163553 A1 | 7/2008 | Liao |
| 2008/0229667 A1 | 9/2008 | Dufour et al. |
| 2009/0025296 A1 | 1/2009 | Petner |
| 2010/0263290 A1 | 10/2010 | Pawloski et al. |
| 2011/0120019 A1 | 5/2011 | Smith et al. |
| 2014/0047772 A1 | 2/2014 | Hulst |
| 2016/0208536 A1 | 7/2016 | Gipson |
| 2018/0010374 A1 * | 1/2018 | Gipson ............... B60J 1/1853 |
| 2019/0383084 A1 * | 12/2019 | Snider ............... B60J 1/1853 |
| 2019/0389293 A1 * | 12/2019 | Scott ............... B60J 1/18 |
| 2022/0295603 A1 | 9/2022 | Snider et al. |
| 2023/0084191 A1 | 3/2023 | Snider et al. |

* cited by examiner

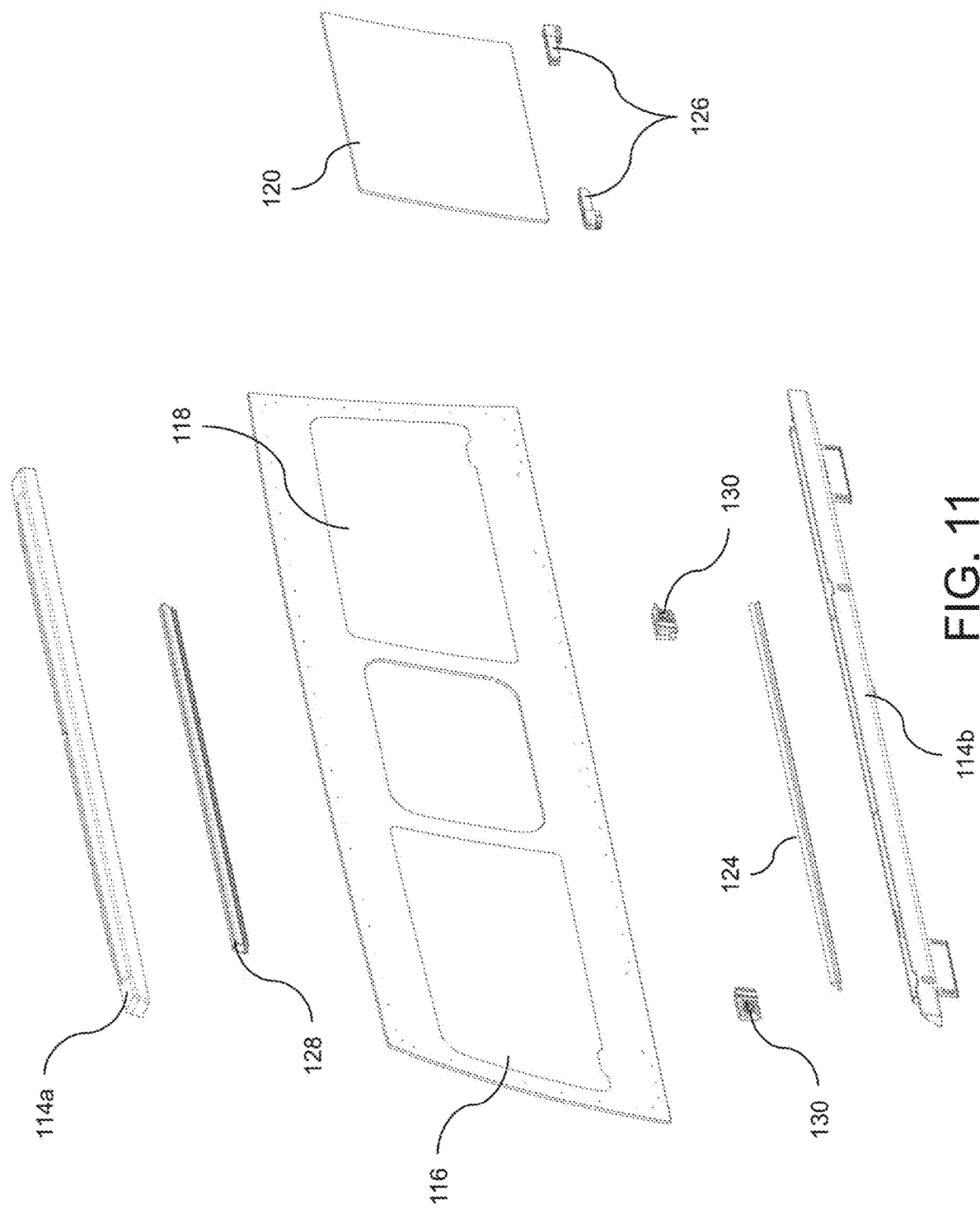

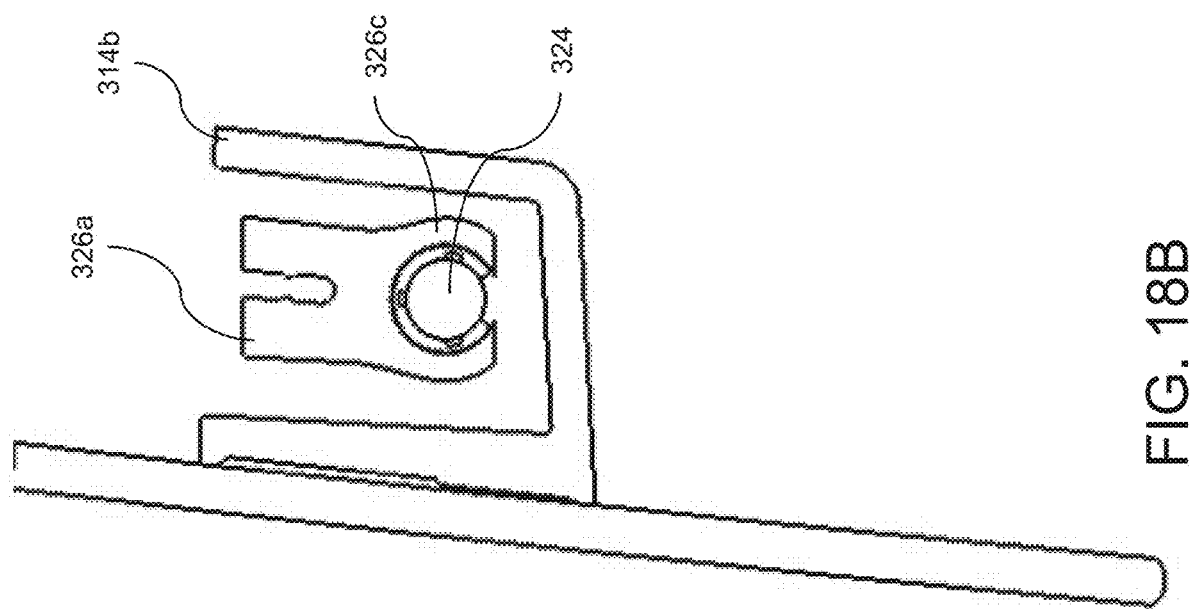

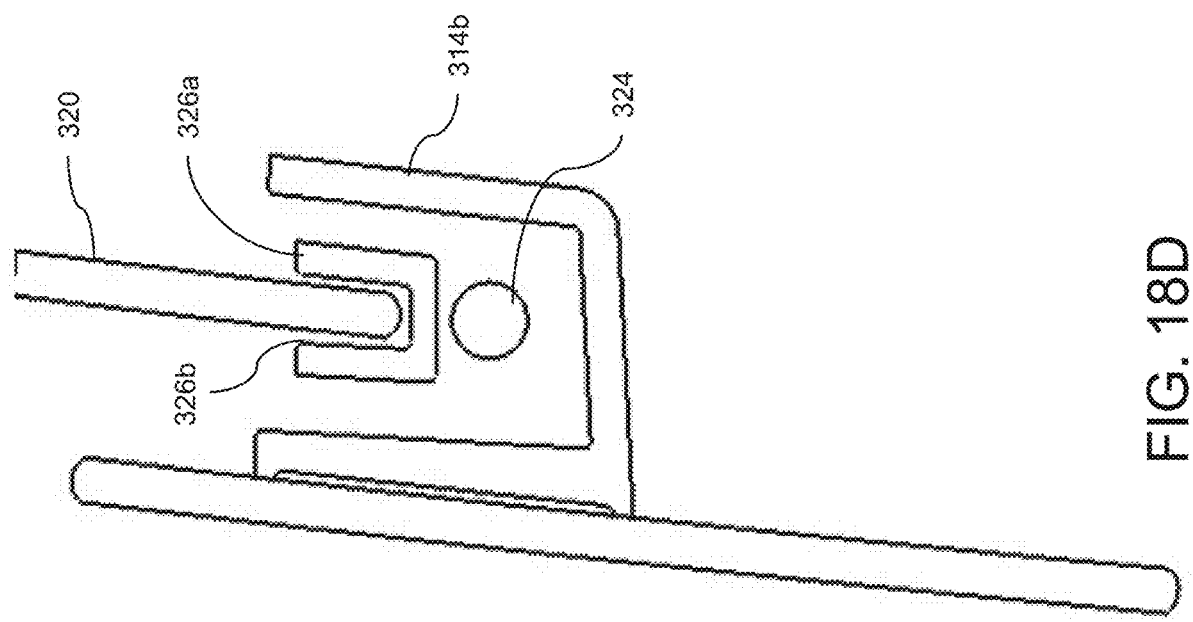

VEHICULAR REAR SLIDER WINDOW ASSEMBLY WITH SLIDER BEARING TRACK

CROSS REFERENCE TO RELATED APPLICATION

The present application claims the filing benefits of U.S. provisional application Ser. No. 63/514,877, filed Jul. 21, 2023, which is hereby incorporated herein by reference in its entirety.

FIELD OF THE INVENTION

The present invention relates generally to movable or slider window assemblies for vehicles and, more particularly to a side or rear slider window assembly for a vehicle such as a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

SUMMARY OF THE INVENTION

A vehicular rear slider window assembly includes a fixed window panel, a movable window panel, and a frame portion fixed relative to the fixed window panel. The frame portion includes an upper rail and a lower rail. The fixed window panel has an opening, and the movable window panel is movable along the upper rail and the lower rail between (i) a closed position, where the movable window panel is disposed at the opening, and (ii) an opened position, where the movable window panel is disposed at least partially along the fixed window panel. A slider bearing system includes a guide element and a carriage. The guide element is disposed at least partially along the lower rail, and the carriage is disposed at a lower perimeter region of the movable window panel. The guide element comprises a bearing element that is slidably and non-rotatably received at a bearing receiving portion of the carriage. The bearing receiving portion of the carriage and/or the bearing element may comprise a low-friction self-lubricating plastic material.

These and other objects, advantages, purposes and features of the present invention will become apparent upon review of the following specification in conjunction with the drawings.

BRIEF DESCRIPTION OF THE DRAWINGS

FIG. 11 is an exploded perspective view of the rear slider window assembly of FIG. 10;

FIG. 18B is a sectional view of a portion of the rear slider window assembly taken along the line B-B in FIG. 18;

FIG. 18D is a sectional view of a portion of the rear slider window assembly taken along the line D-D in FIG. 18;

DESCRIPTION OF THE PREFERRED EMBODIMENTS

Figure 1:
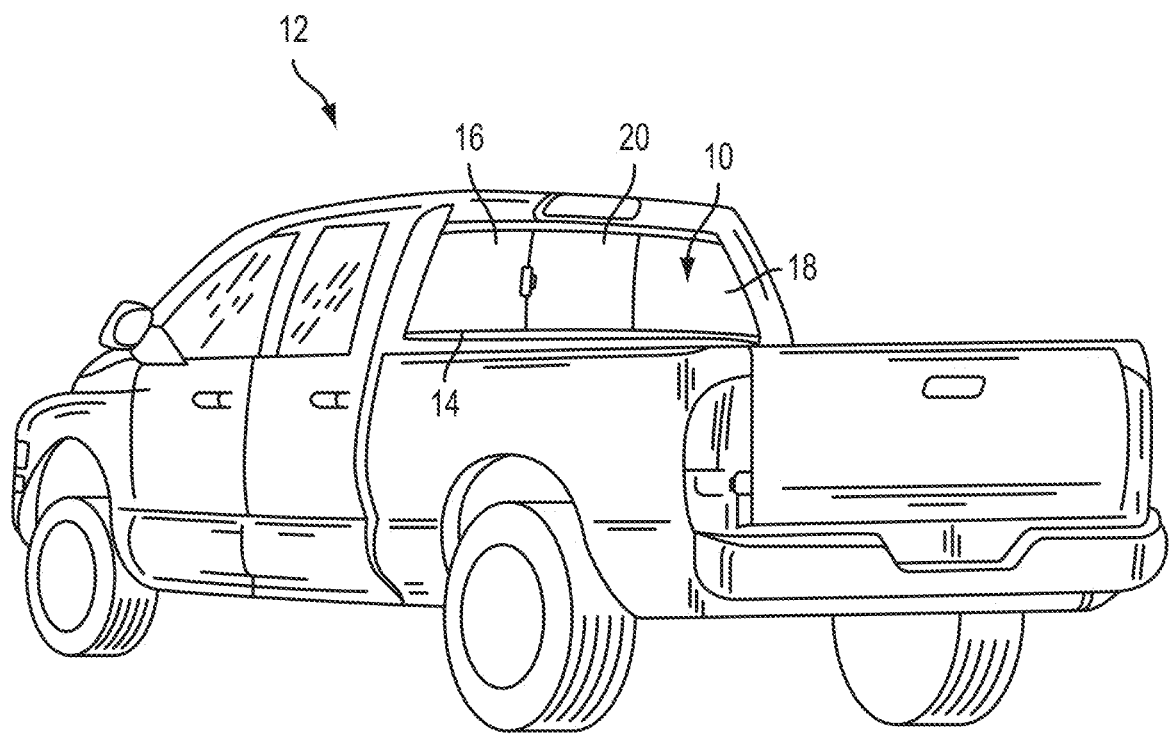
FIG. 1 is a rear perspective view of a pickup truck having a rear slider window assembly.
Figure 2:
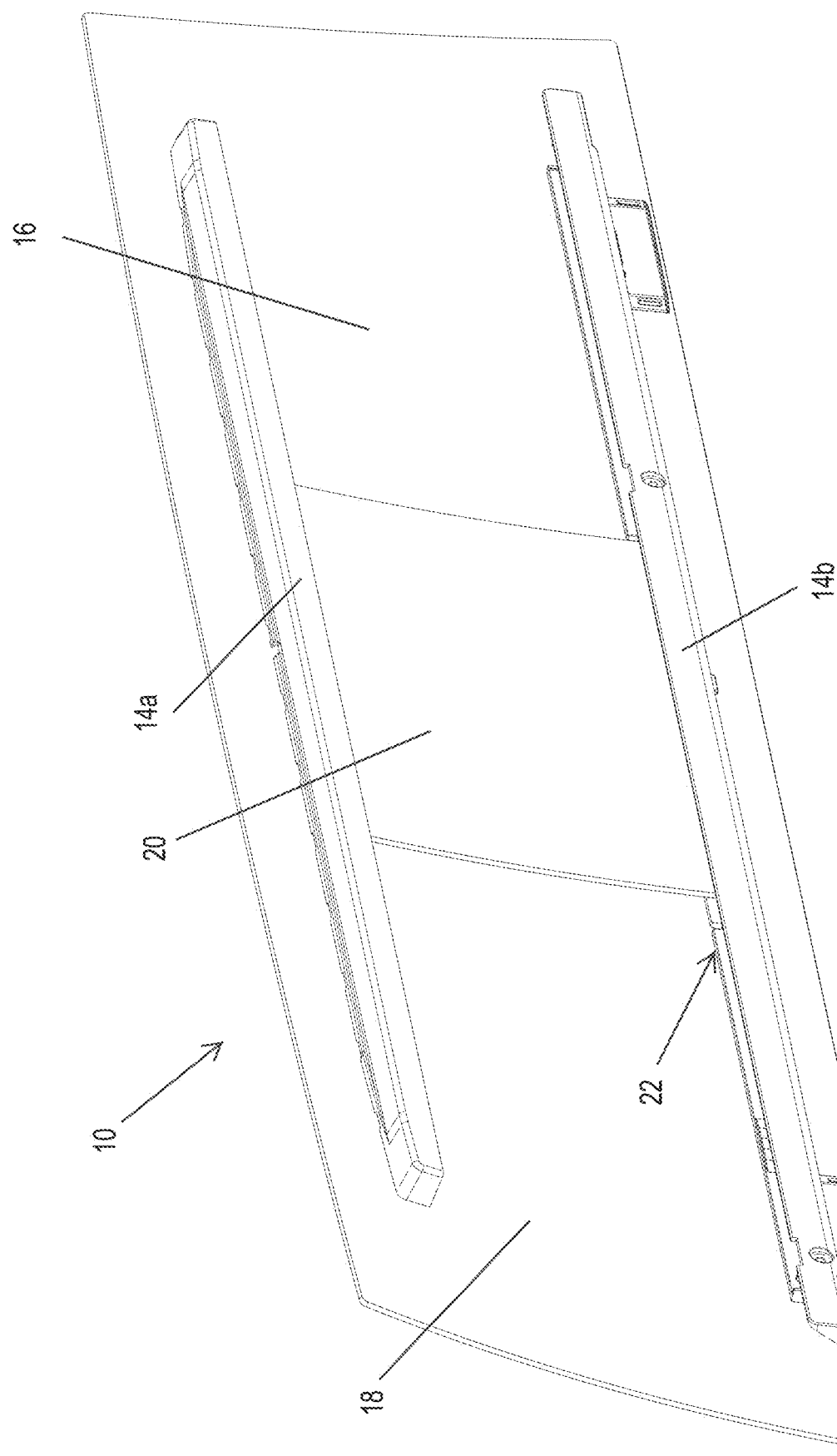
FIG. 2 is a perspective view of the rear slider window assembly.

Referring now to the drawings and the illustrative embodiments depicted therein, a rear slider window assembly 10 of a vehicle 12 (such as a pickup truck or the like) includes a window frame 14 (having an upper rail 14a and a lower rail 14b), a pair of side fixed window panels 16, 18 and a movable window panel 20 that is movable relative to the frame 14 and the fixed window panels 16, 18 between an opened position and a closed position (FIGS. 1 and 2). The fixed window panels 16, 18 may be spaced from one another to define an opening or aperture between the fixed window panels 16, 18. Optionally, the window assembly includes a single fixed window panel having an opening between opposing sides or portions of the fixed window panel. In the closed position, the movable window panel 20 is disposed at the opening between the fixed window panels 16, 18 (or at the opening between the sides or portions of the singular fixed window panel). In the opened position, the movable window panel 20 is disposed at least partially along one of the fixed window panels 16, 18 (or along one side or portion of the singular fixed window panel).

Figure 3:
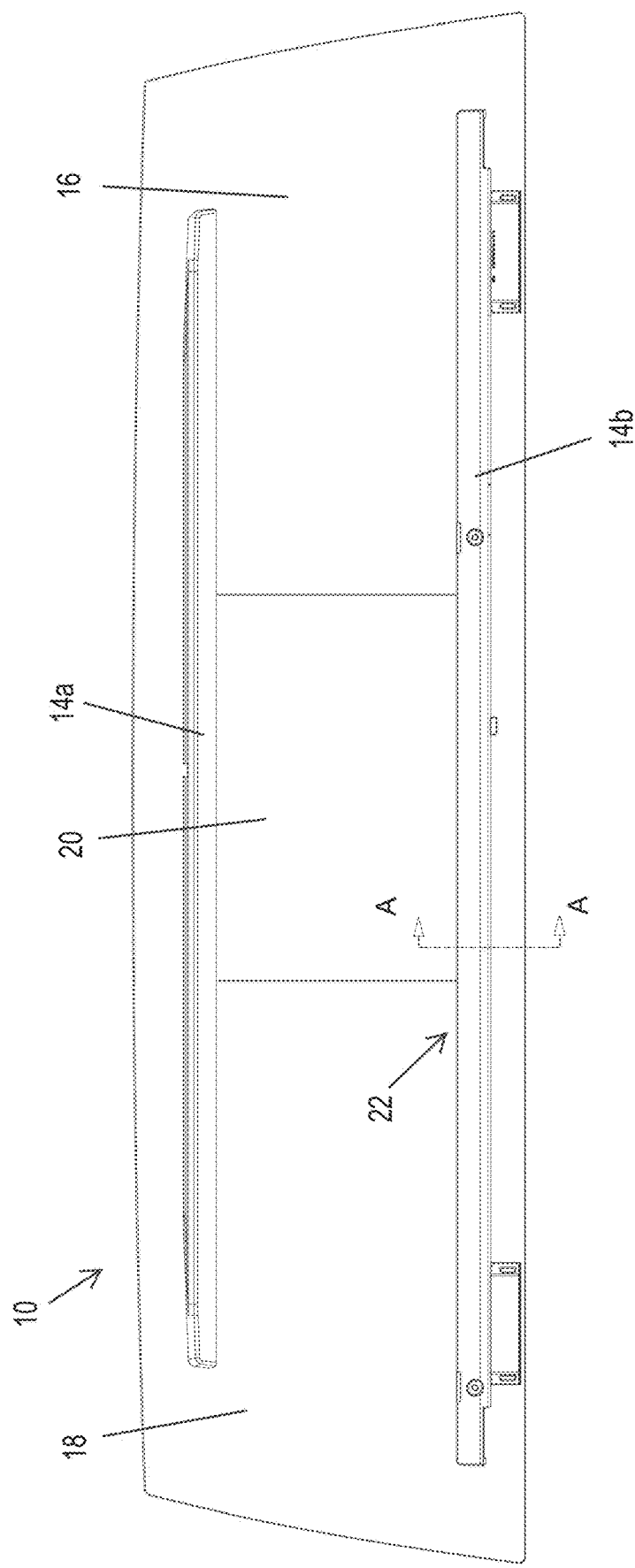
FIG. 3 is a plan view of the rear slider window assembly.
Figure 3A:
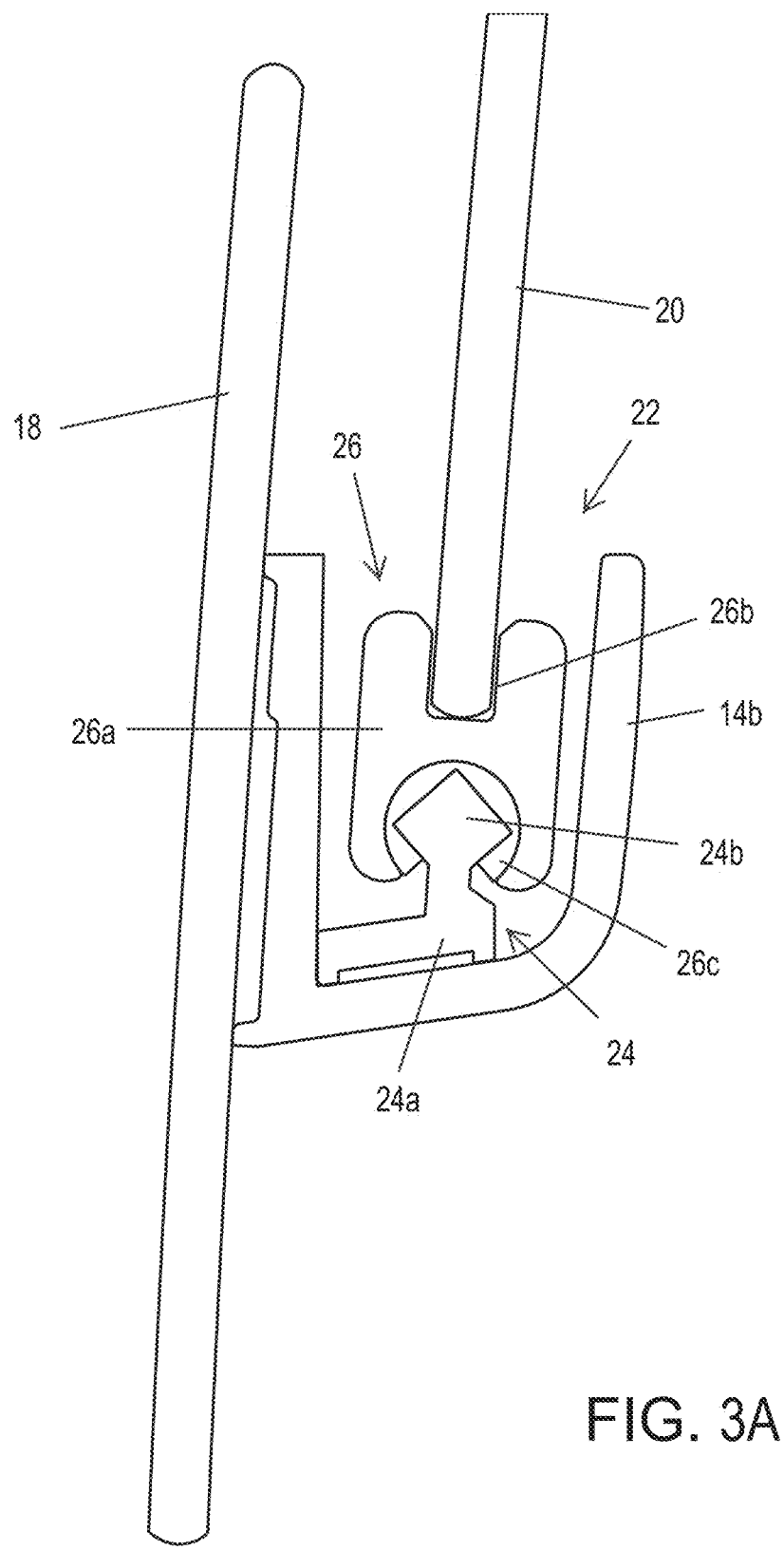
FIG. 3A is a sectional view of a portion of the rear slider window assembly taken along the line A-A in FIG. 3.
Figure 4:
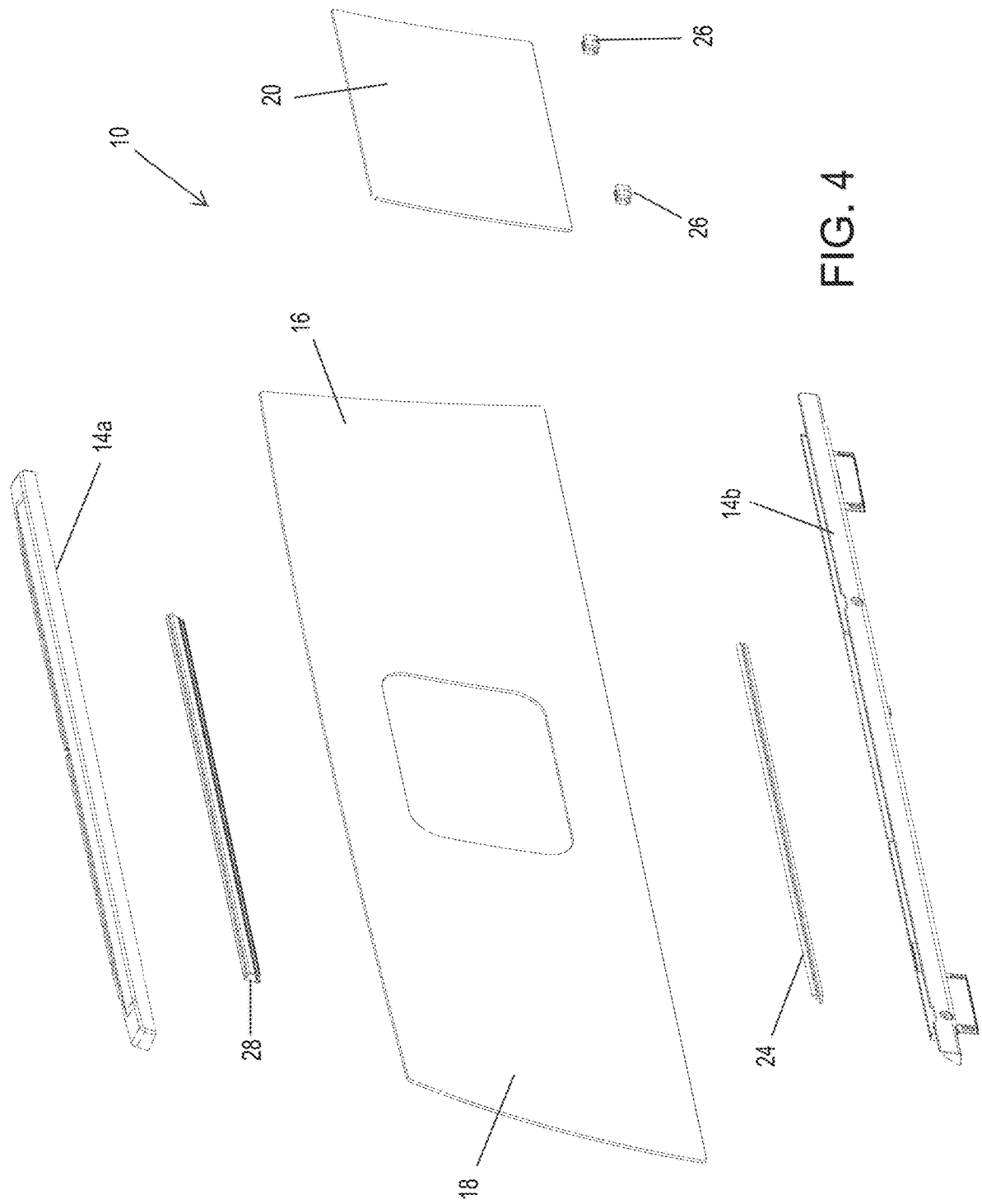
FIG. 4 is an exploded perspective view of part of the rear slider window assembly.
Figure 5:
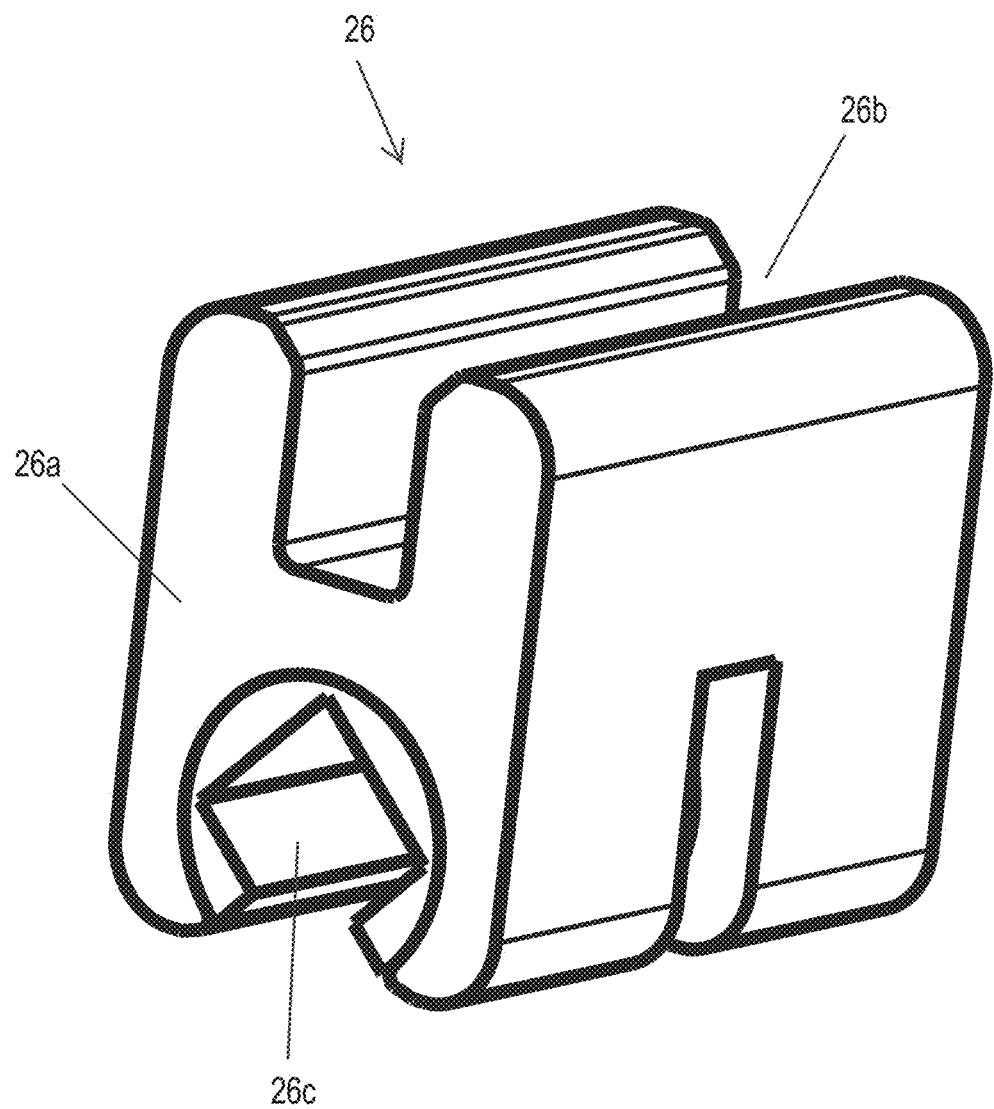
FIG. 5 is a perspective view of one of the carriage elements of the rear slider window assembly.
Figure 6:
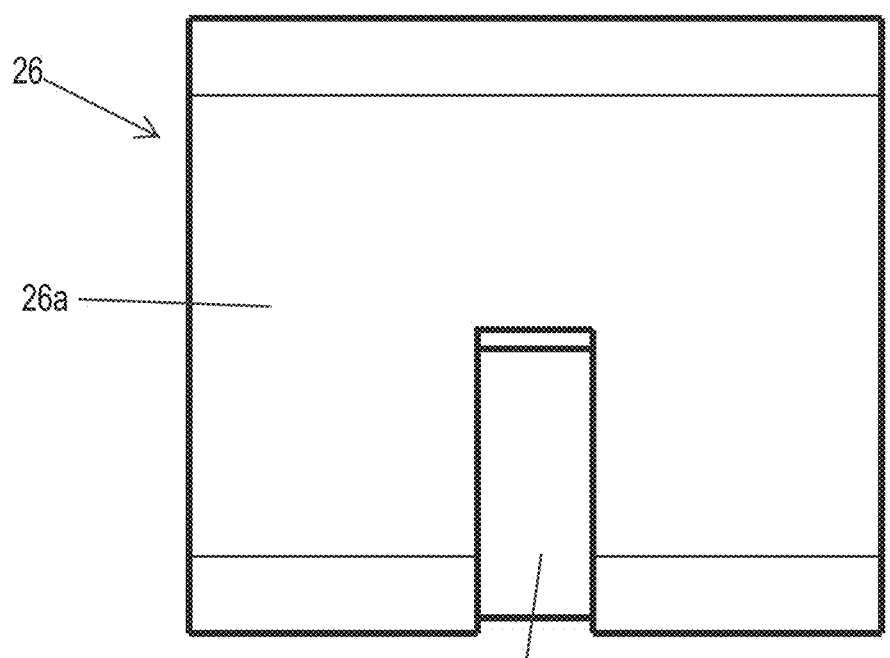
FIG. 6 is a side view of the carriage element of FIG. 5.
Figure 7:
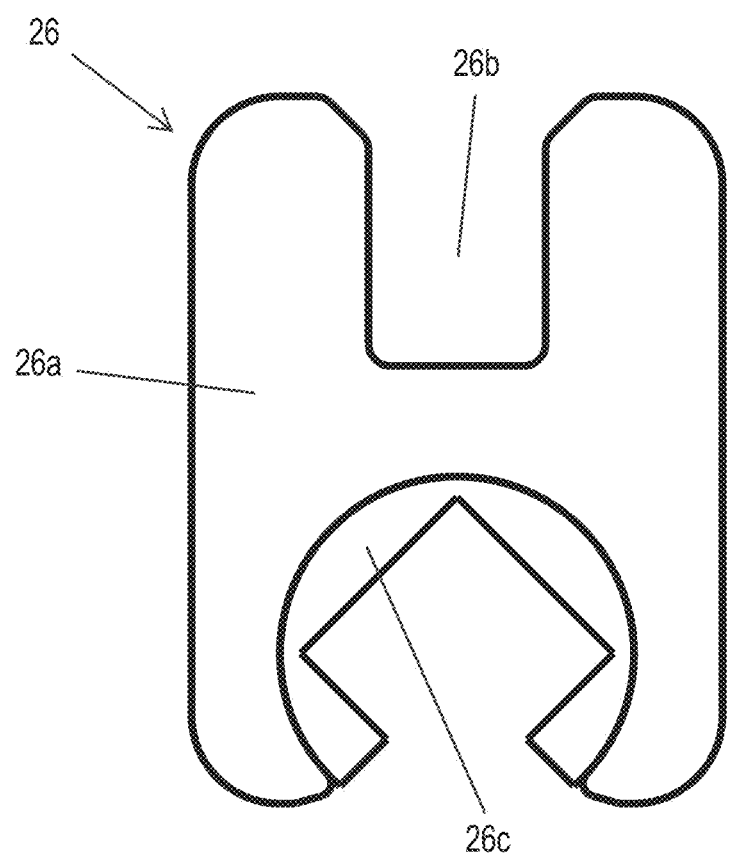
FIG. 7 is an end view of the carriage element of FIG. 5.
Figure 8:
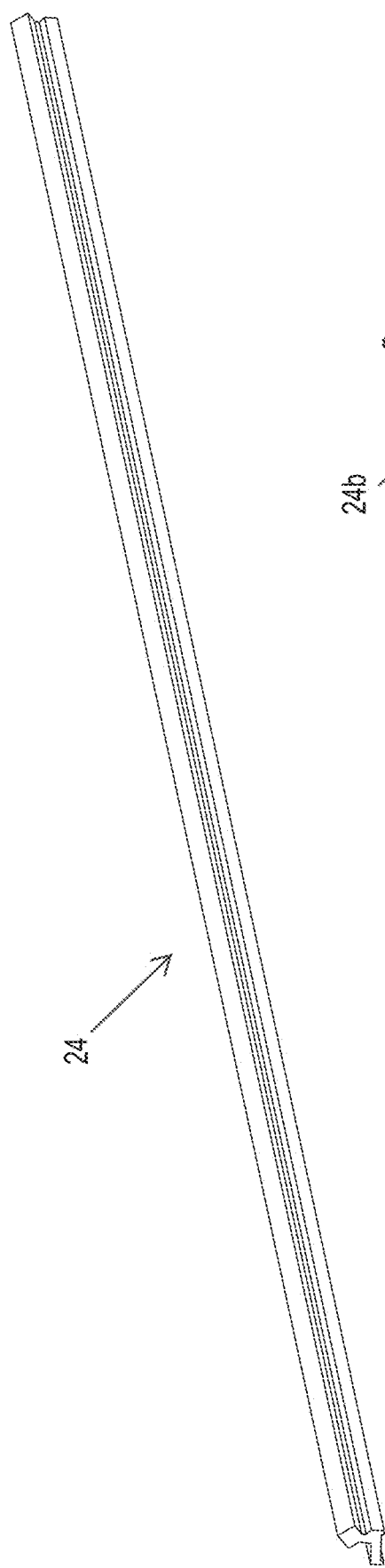
FIG. 8 is a perspective view of the guide of the rear slider window assembly.
Figure 9:
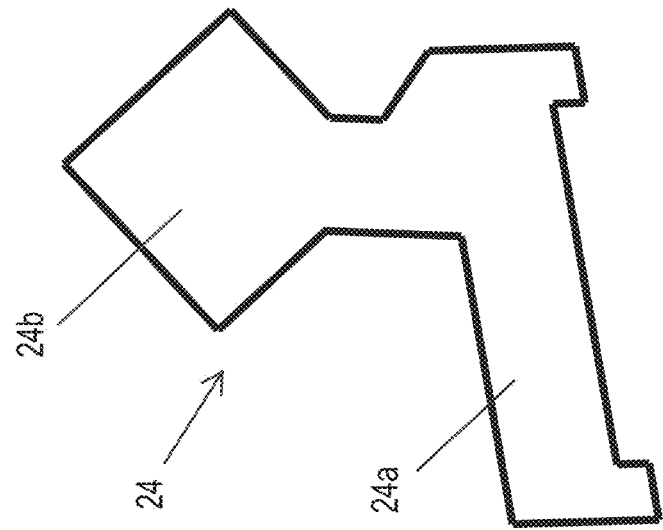
FIG. 9 is an end view of the guide of FIG. 8.

As shown in FIGS. 3-9, the movable window panel 20 slides along the upper and lower rails between the closed position and the opened position via a slider bearing track system 22. In the illustrated embodiment, the slider bearing track system 22 includes an elongated guide element 24 disposed along at least the portion of the lower rail 14*b* along which the movable window panel 20 moves when opening and closing. That is, the guide element 24 is disposed along the lower rail 14*b* (e.g., within a channel of the lower rail) at least along a portion of the lower rail 14*b* corresponding to a range of motion of the movable window panel 20 along the lower rail 14*b* between the closed position and the opened position. The guide element 24 includes a base portion 24*a* that is configured to attach (such as adhesively attach) at a lower portion or wall of the lower rail 14*b* (see FIG. 3A). The guide element 24 also includes a bearing element 24*b* that protrudes upward from the base portion 24*a* and is configured to be received in one or more carriages or carriage elements 26 of the slider bearing track system 22. Put another way, the lower rail 14*b* includes a substantially U-shaped channel and the base portion 24*a* of the guide element 24 is attached to the lower portion of the channel with the bearing element 24*b* extending away from the base portion 24*a* and within the channel.

The one or more carriages 26 each include a body portion 26*a* that has a recess or slot 26*b* at an upper end for receiving and attaching at a lower perimeter edge region of the movable window panel 20. The one or more carriages 26 further include a guide receiving portion 26*c* at a lower end that slidably receives the bearing element 24*b*. The guide receiving portion 26*c* may be an integral part of the body portion 26*a* or may be a separate, low-friction plastic element (as shown) that is received in a recess or channel at and along the lower portion of the body portion and secured to the body via adhesive or via the body portion being overmolded onto the low-friction plastic or via any suitable attachment means. For example, the body portion 26*a* of the carriage 26 includes a channel or recess and the guide receiving portion 26*c* is disposed at least partially within or along the channel or recess. The guide receiving portion 26*c* includes a low-friction material or coating and is configured to receive at least a portion of the bearing element 24*b* (that may also or otherwise include a low-friction material or coating) to enable movement of the carriage 26 and the movable window panel 20 along the guide element 24 and lower rail 14*b*. The movable window panel is attached to multiple carriages 26 (such as two carriages in FIG. 4 or more), which all slidably receive the bearing element and thus movably attach the movable window panel to the guide element 24.

The guide receiving portion 26*c* of the carriage 26 and the bearing element 24*b* of the guide element provide for low friction sliding movement of the carriage (and thus the movable window panel) along the guide element 24. The portions and elements may utilize self-lubricating plastic materials, such as, for example, self-lubricating IGLIDE® plastic materials commercially available from igus Inc. of East Providence, RI. For example, the guide receiving portion 26*c* may comprise a low friction self-lubricating plastic material and the guide portion may also comprise a similar or same low-friction self-lubricating plastic material or the guide portion may comprise a different material, such as an engineered plastic material, such as, for example, polypropylene or nylon or polycarbonate or acetal or ABS (acrylonitrile butadiene styrene).

During assembly of the rear slider window assembly, the guide element is attached at and within the lower rail, and the movable panel is end-loaded into the rail and aligned with the guide element so that the carriages receive and slide onto the bearing of the guide element. The bearing of the guide element and the guide receiving portion are shaped to limit or preclude any rotation of the carriage (and thus the movable window panel) about a longitudinal axis of the guide element relative to the guide element (and thus the lower rail). In the illustrated example of FIGS. 7 and 9, the cross section shapes of the bearing 24*b* of the guide element 24 and guide receiving portion 26*c* are generally square-shaped to facilitate sliding movement without any tilting of the movable window panel 20. However, any other suitable non-circular shapes (e.g., triangular or rectangular or pentagonal or hexagonal or other polygonal shape or oval shape) may be utilized to facilitate sliding movement without tilting of the movable window panel. The two carriages are spaced apart along the lower perimeter region of the movable window panel to support the window panel and to limit or preclude tilting or "chucking" of the window panel as it is being opened or closed.

Thus, the low friction sliding of the carriages along the guide element provides for smooth opening and closing of the movable window panel with reduced noise, reduced vibration, reduced sliding force, and reduced center glass movement "chucking." Although shown and described with the bearing element received in the bearing receiving portion of the carriages, the carriages may have the bearing element that protrudes downwardly from the carriage and is slidably received in a bearing receiving portion of the guide element attached at the lower rail. Although shown and described with the guide element attached at the lower rail and the carriages attached at the lower perimeter region of the movable window panel, the carriages may be attached at the rail or channel and the guide element may be attached along the lower perimeter region of the movable window panel. Although shown and described with the slider bearing track system being disposed along the lower rail and at the lower perimeter edge region of the movable window panel, the slider bearing track system (having carriages and a guide element) may also or otherwise be disposed along the upper rail and at the upper perimeter edge region of the movable window panel, and may replace the upper seal element 28 (FIG. 4) at and within the upper rail 14*a*.

Optionally, the bearing element of the guide element and the guide receiving portion of the carriage include substantially circular cross-sections, with a portion of the carriage body engaging or riding along the body portion of the guide element to preclude rotation of the carriage element and movable window panel about the longitudinal axis of the guide element. For example, and as shown in FIGS. 10-13, a window assembly 110 includes a window frame 114, having an upper rail 114*a* and a lower rail 114*b*, a first side fixed window panel or fixed window portion 116 and a second side fixed window panel or fixed window portion 118. An aperture or opening is disposed between the first side fixed window panel 116 and the second side fixed window panel 118. A movable window panel 120 is supported by the window frame 114 and movable along the frame relative to the fixed window panels 116, 118 between a closed position, where the movable window panel 120 is disposed at and closes the opening, and an opened position, where the movable window panel 120 is moved away from the opening and at least partially along one of the fixed window panels. The movable window panel 120 is movable along the window frame 114 between the closed position and the opened position via operation of a slider bearing track system 122. In the illustrated example, the slider bearing track system 122 is accommodated in the lower rail 114b of the window frame 114. Optionally, portions of the slider bearing track system 122 may be disposed within and/or integrally formed with the upper rail 114a and/or the lower rail 114b.

Figure 10:
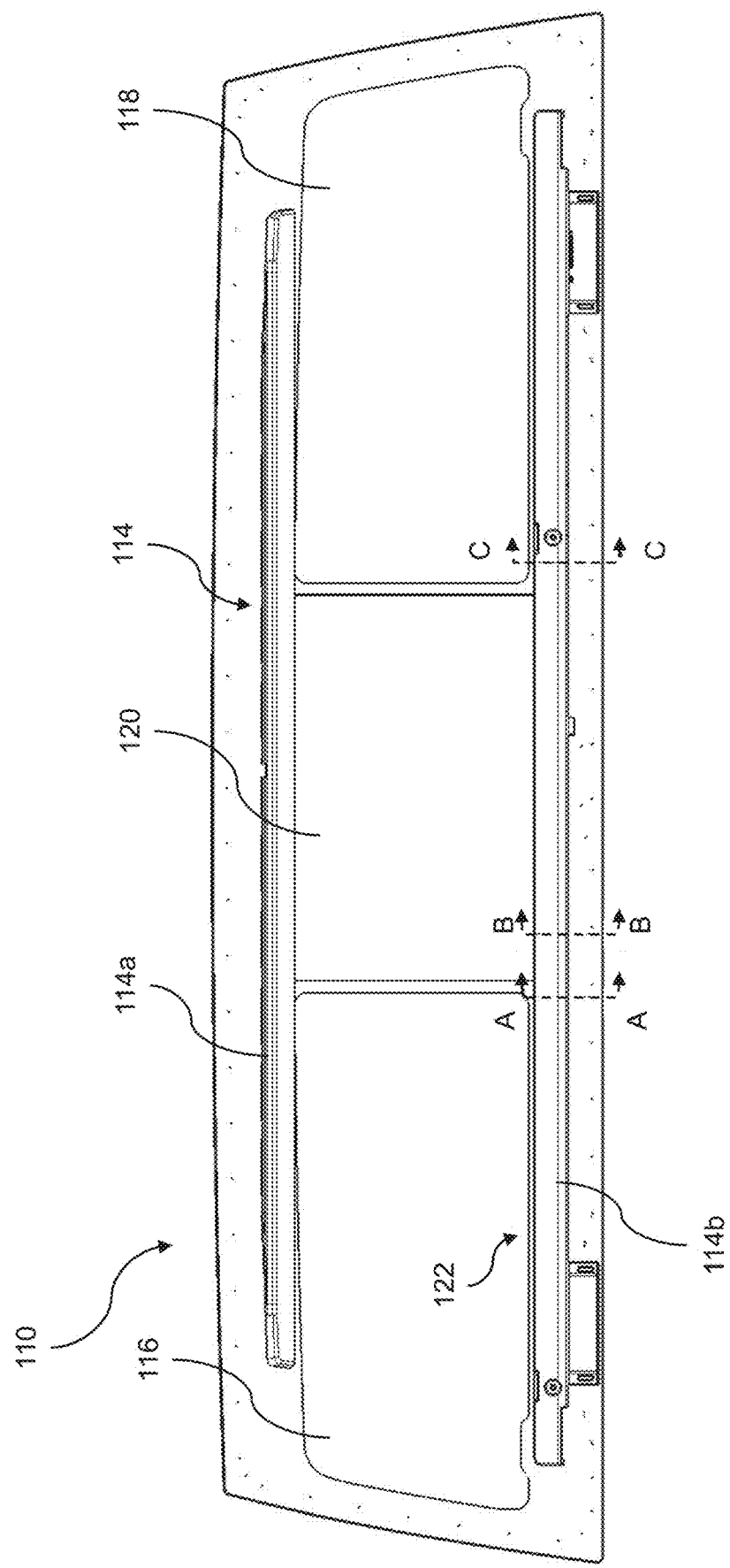
FIG. 10 is a plan view of another rear slider window assembly.
Figure 10A:
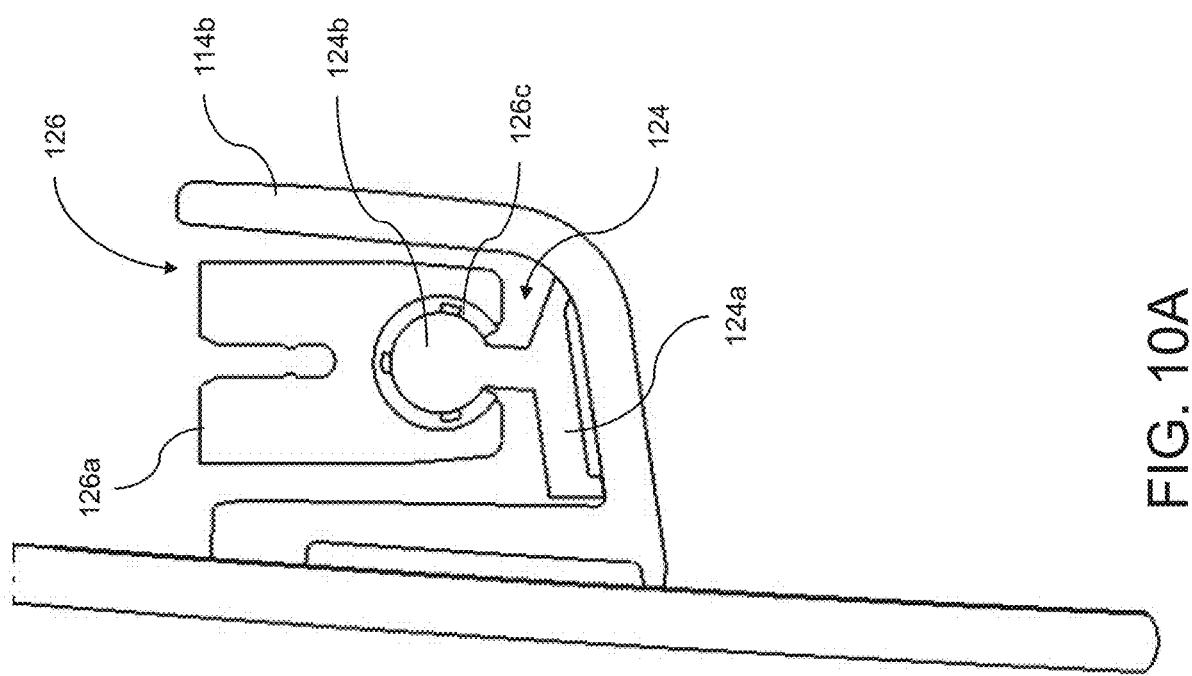
FIG. 10A is a sectional view of a portion of the rear slider window assembly taken along the line A-A in FIG. 10.
Figure 10B:
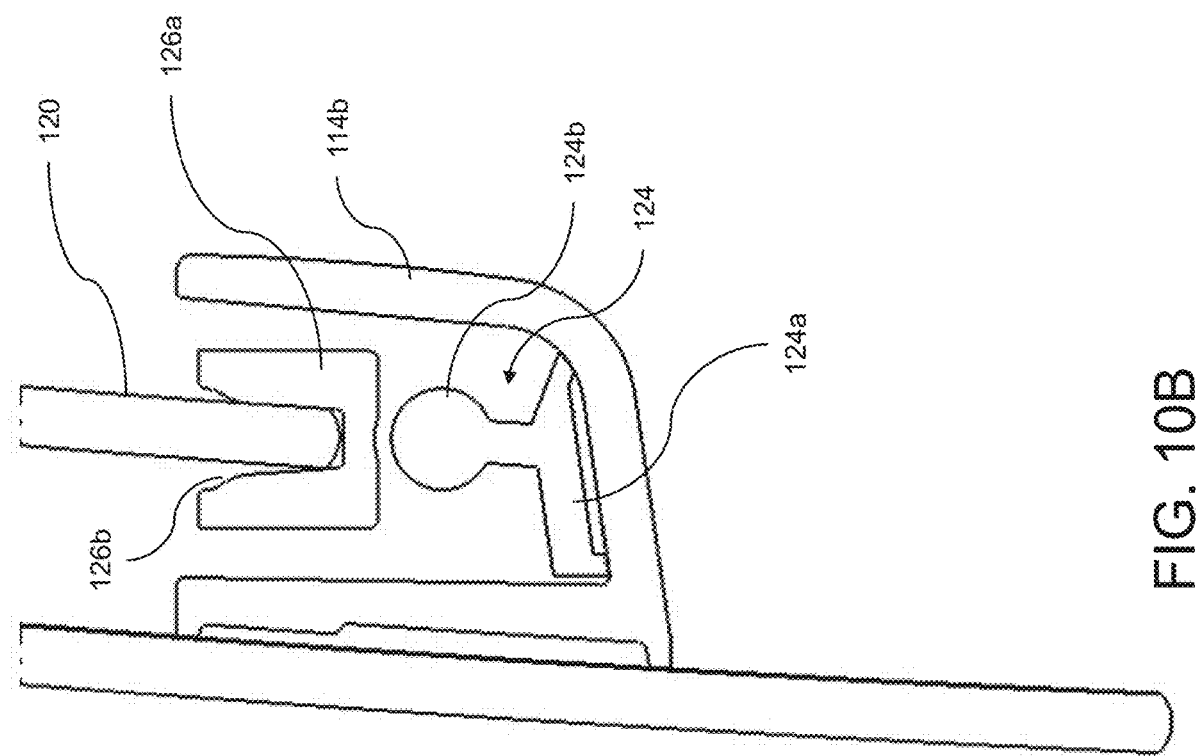
FIG. 10B is a sectional view of a portion of the rear slider window assembly taken along the line B-B in FIG. 10.
Figure 10C:
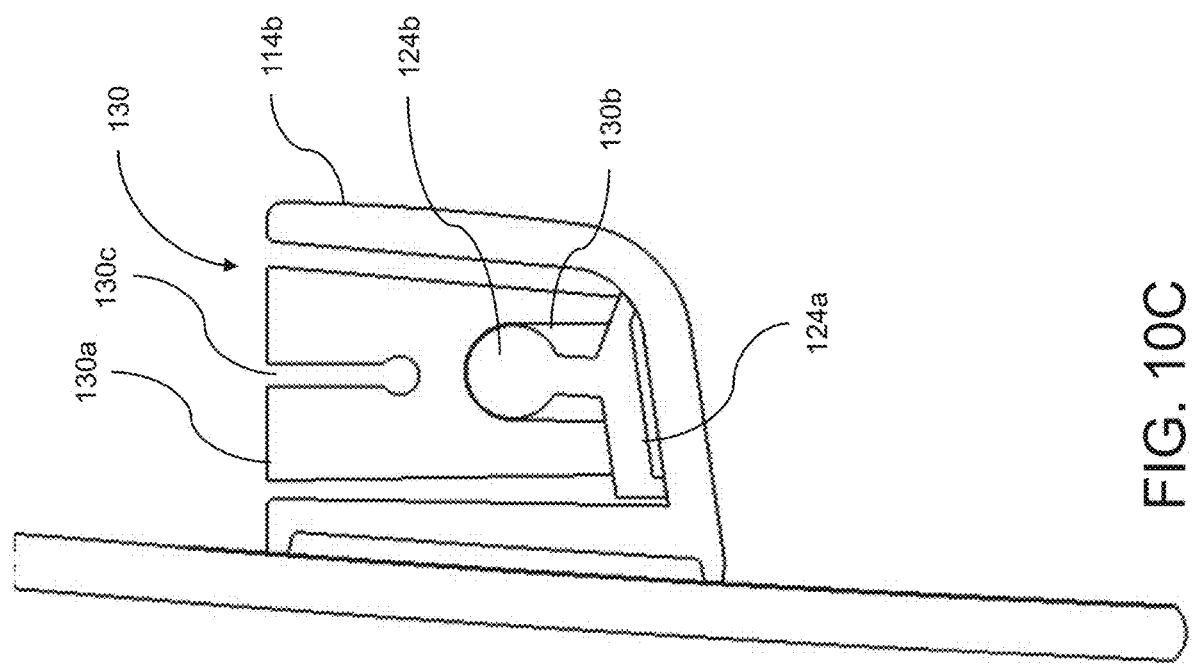
FIG. 10C is a sectional view of a portion of the rear slider window assembly taken along the line C-C in FIG. 10.
Figure 12:
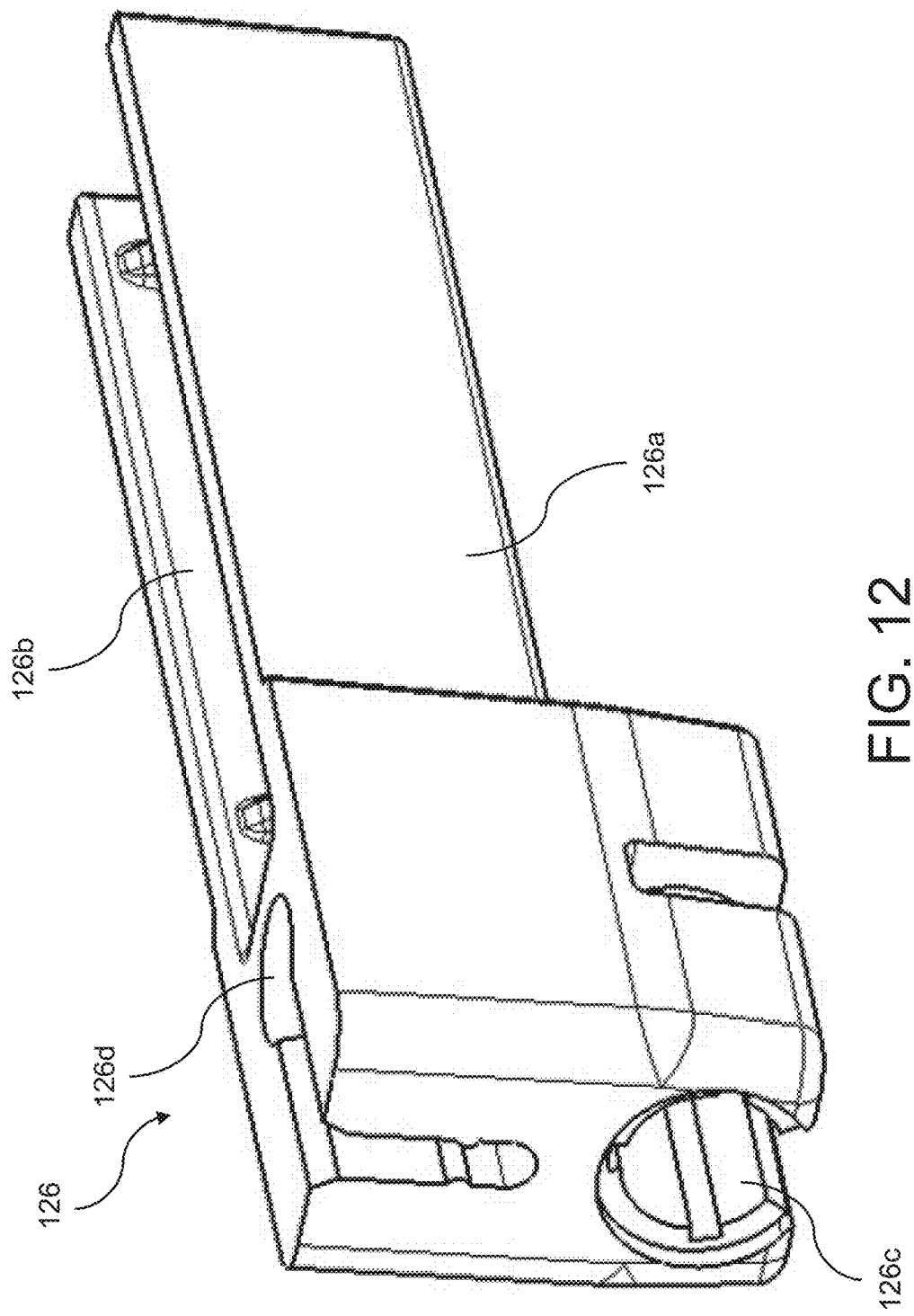
FIG. 12 is a perspective view of one of the carriage elements of the rear slider window assembly of FIG. 10.
Figure 13:
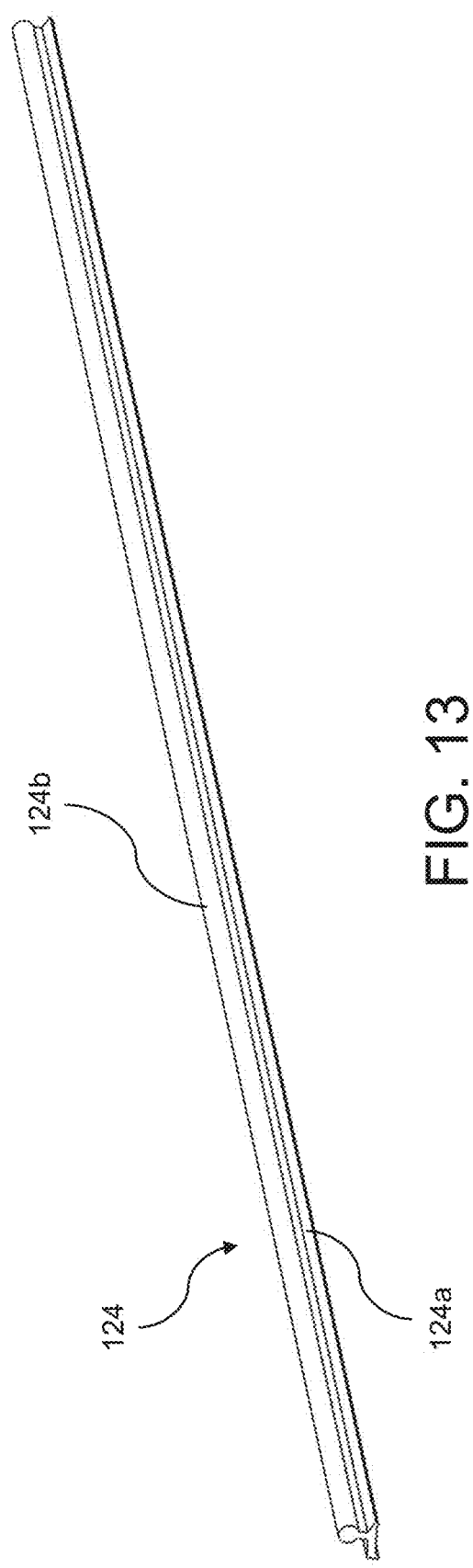
FIG. 13 is a perspective view of the guide of the rear slider window assembly of FIG. 10.

As shown in FIGS. 10A-10C, an elongated guide element 124 of the slider bearing track system 122 is disposed within a channel of the lower rail 114b and extends along a portion of the lower rail 114b corresponding at least to the range of motion of the movable window panel 120. The guide element 124 includes a base portion 124a that sits at the bottom or lower surface of the channel of the lower rail 114b. For example, the base portion 124a adhesively attaches at the lower surface or portion of the lower rail 114b. A bearing element 124b extends from the base portion 124a and within the channel of the lower rail 114b. In the illustrated example, the bearing element 124b includes a cylindrical portion or rail extending along a longitudinal axis of the bearing element 124b with a stem or connecting portion extending between the base portion 124a and the cylindrical portion.

One or more carriage elements 126 are disposed along a lower perimeter edge region of the movable window panel 120 and configured to ride along the guide element 124 to enable movement of the movable window panel 120 between the closed position and the opened position. For example, a carriage element 126 is disposed at each lower corner region of the movable window panel 120. An upper seal or rail portion 128 may be disposed along an upper perimeter edge region of the movable window panel 120 and disposed within the upper rail 114a of the window frame 114.

The carriage element 126 includes a body portion 126a that includes a recess or slot 126b at an upper portion of the body configured to receive and attach to the movable window panel 120. For example, the movable window panel 120 may be received within the recess 126b and adhesively attach to the body portion 126a and/or be secured relative to the carriage 126 via friction fit. The carriage 126 may include protrusions or bumpers extending within the recess 126b for forming the friction fit between the movable window 120 and the carriage 126.

A lower portion of the body 126a includes a guide receiving portion 126c configured to slidably receive the bearing 124b of the guide element 124. In the illustrated example, the guide receiving portion 126c includes a rounded or at least partially cylindrical channel or passageway that receives the rail of the bearing 124b. Further, the guide receiving portion 126c includes an opening or slot at a lower portion of the cylindrical channel that accommodates the stem of the bearing 124b. The guide receiving portion 126c may include recesses or indentations to prevent the bearing 124b from sticking to the inner surfaces of the guide receiving portion 126c. As shown in FIG. 10B, a gap may be disposed between the bearing portion 124b of the guide element 124 and the portion of the body 126a having the window receiving recess 126b.

Thus, with the carriage 126 attached along the lower edge region of the movable window panel 120 and the guide receiving portion 126c slidably received along the bearing portion 124b of the guide element 124, the carriage 126 and movable window panel 120 are movable along the guide element 124 to move the movable window panel 120 along the window frame 114. For example, the carriage 126 and movable window panel 120 may be movable via operation of a cable drive system, with the ends of the cable received within receiving portions 126d (FIG. 12) of the carriages. To prevent the carriage 126 and the movable window panel 120 from pivoting about the longitudinal axis of the guide element 124 (e.g., pivoting about the rounded bearing 124b), portions of the carriage 126 may engage the stem and/or base portion 124a of the guide element 124. Optionally, a gap or clearance between the carriage 126 and the stem or base portion 124a may allow for some rotation or pivoting of the carriage 126 and movable window panel 120 relative to the longitudinal axis of the guide element 124.

Referring to FIGS. 10C and 11, stops 130 may be disposed at least partially within the channel of the lower rail 114b at opposing ends of the guide element 124. The stops 130 may be configured to engage the carriages 126 when the movable window panel 120 is in the closed and opened positions. That is, the stops 130 may be disposed at the ends of the guide element 124 to define the ends of the range of motion of the movable window panel 120. In the illustrated example, each stop 130 includes a body portion 130a with a generally U-shaped channel or slot 130b extending along a lower portion of the body 130a. The slot 130b is configured to receive the bearing portion 124b of the guide element 124 with the lower portion of the body 130a resting on or engaging the base portion 124a of the guide element 124. The stops 130 may be attached to the guide element 124, such as adhesively attached or fastened via one or more fasteners, and/or the stops 130 may be integrally formed with the guide element 124, such as via an injection molding process. The stops 130 may include wings or tabs extending from opposing sides of the body portion 130a and configured to be received within respective slots or receiving portions of the lower rail 114b to maintain positioning of the stops 130 along the longitudinal axes of the guide element 124 and lower rail 114b. The stops include a cable guide or cable receiving portion 130c for receiving and guiding the cable of the cable drive system.

In some examples, the guide element disposed in the lower rail of the window frame may include a channel or track configured to receive a tab or wing or guide portion of the carriage. For example, and referring to FIGS. 14-17, a window assembly 210 includes a window frame 214, having an upper rail 214a and a lower rail 214b, a first side fixed window panel or fixed window portion 216 and a second side fixed window panel or fixed window portion 218. An aperture or opening is disposed between the first side fixed window panel 216 and the second side fixed window panel 218. A movable window panel 220 is supported by the window frame 214 and movable along the frame relative to the fixed window panels 216, 218 between a closed position and an opened position via operation of a slider bearing track system 222.

Figure 14:
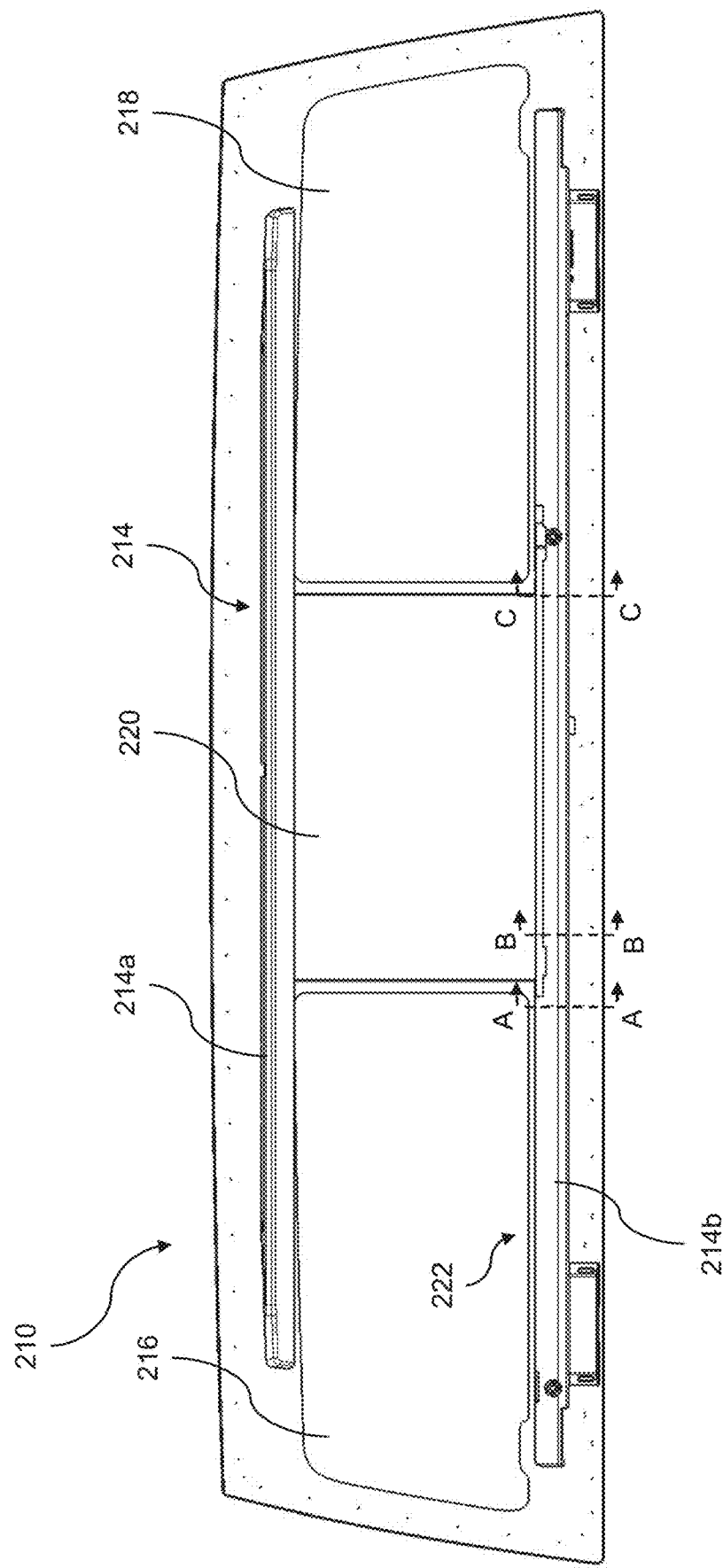
FIG. 14 is a plan view of another rear slider window assembly.
Figure 14A:
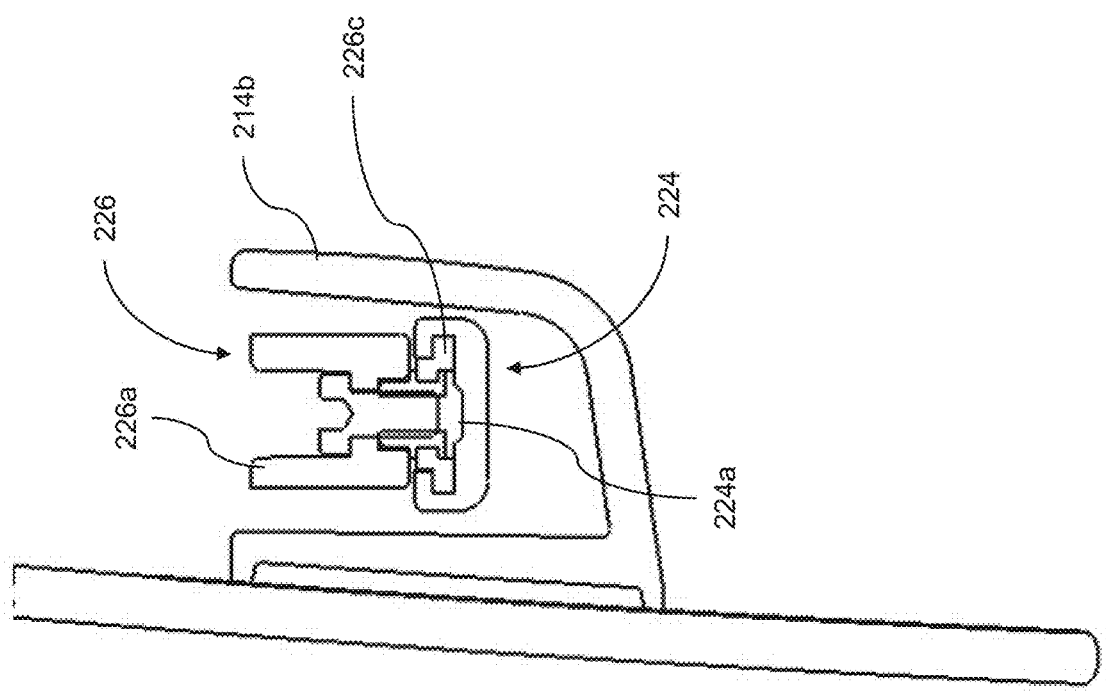
FIG. 14A is a sectional view of a portion of the rear slider window assembly taken along the line A-A in FIG. 14.
Figure 14B:
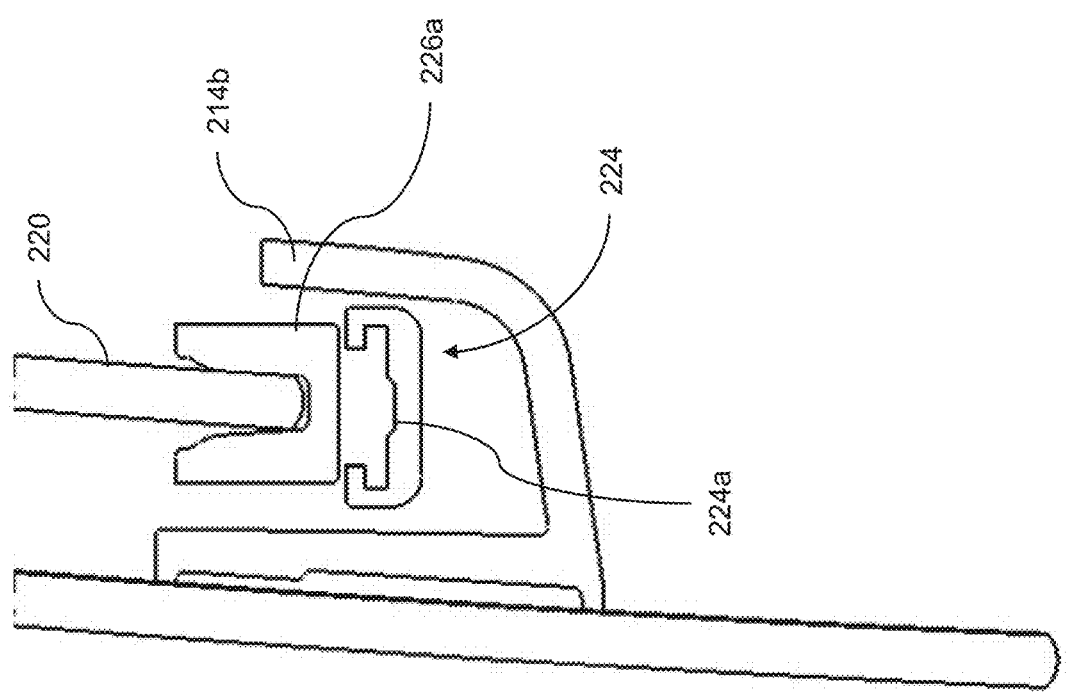
FIG. 14B is a sectional view of a portion of the rear slider window assembly taken along the line B-B in FIG. 14.
Figure 14C:
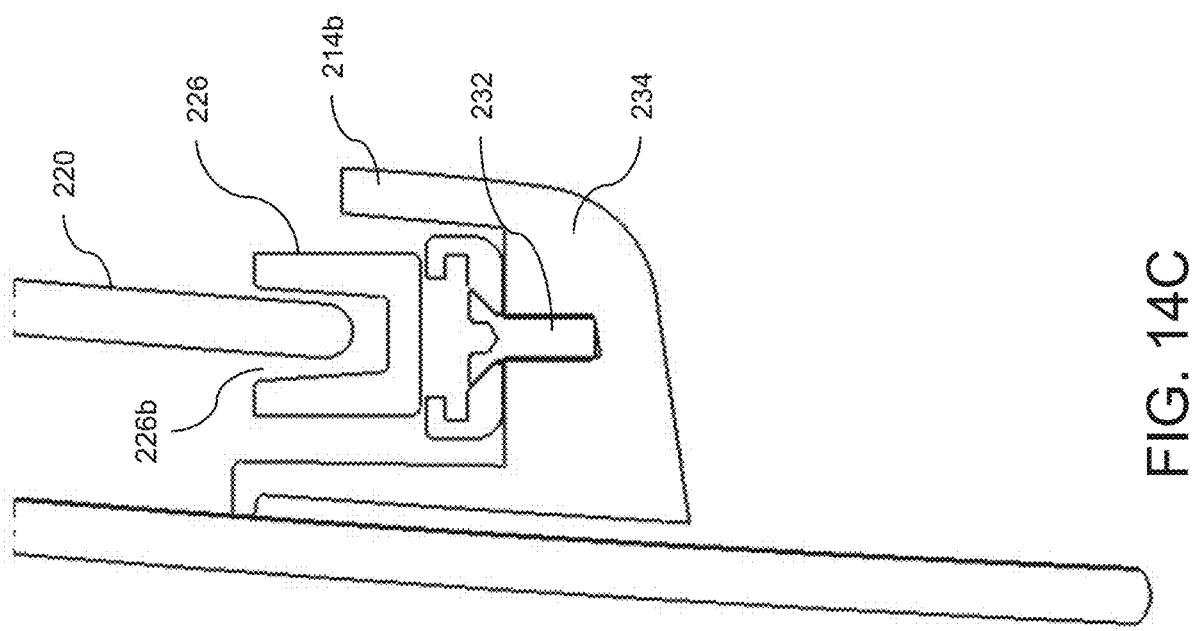
FIG. 14C is a sectional view of a portion of the rear slider window assembly taken along the line C-C in FIG. 14.
Figure 15:
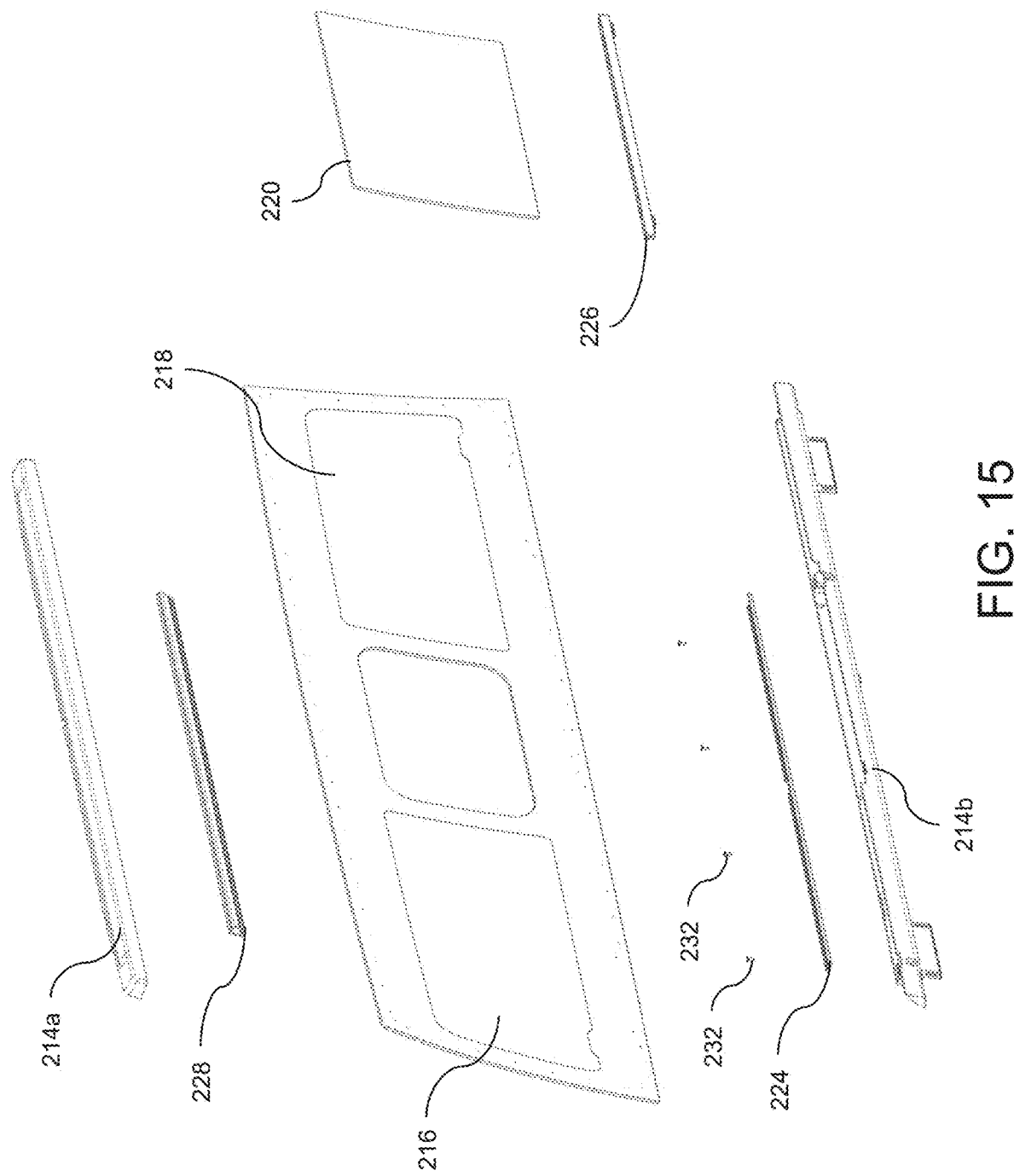
FIG. 15 is an exploded perspective view of the rear slider window assembly of FIG. 14.

As shown in FIGS. 14A-14C, an elongated guide 224 of the slider bearing track system 222 is disposed within a channel of the lower rail 214b and extends along a portion of the lower rail 214b corresponding to at least to the range of motion of the movable window panel 220. The guide element 224 includes a channel or track portion 224a that extends along a longitudinal axis of the guide element 224. At least a portion of the guide element 224 may be spaced from or elevated from the lower portion or surface of the U-shaped channel of the lower rail 214b. For example, fasteners 232 (e.g., threaded fasteners) may attach the guide element 224 to respective base portions 234 of the lower rail 214b.

A carriage element 226 is disposed along a lower perimeter edge region of the movable window panel 220 and is configured to ride along the channel 224a of the guide element 224 to enable movement of the movable window panel 220 along the lower rail 214b. In the illustrated example, the carriage element 226 receives the entire lower perimeter edge region of the movable window panel 220. An upper seal or rail portion 228 may be disposed along an upper perimeter edge region of the movable window panel 220 and disposed within the upper rail 214a of the window frame 214.

The movable window panel 220 is received within a recess or slot 226b formed along an upper portion of a body 226a of the carriage element 226. For example, the movable window panel 220 may be received within the recess 226b and adhesively attach to the body portion 226a and/or be secured relative to the carriage 226 via friction fit. The carriage 226 may include protrusions or bumpers extending within the recess 226b for forming the friction fit between the movable window 220 and the carriage 226.

Figure 16:
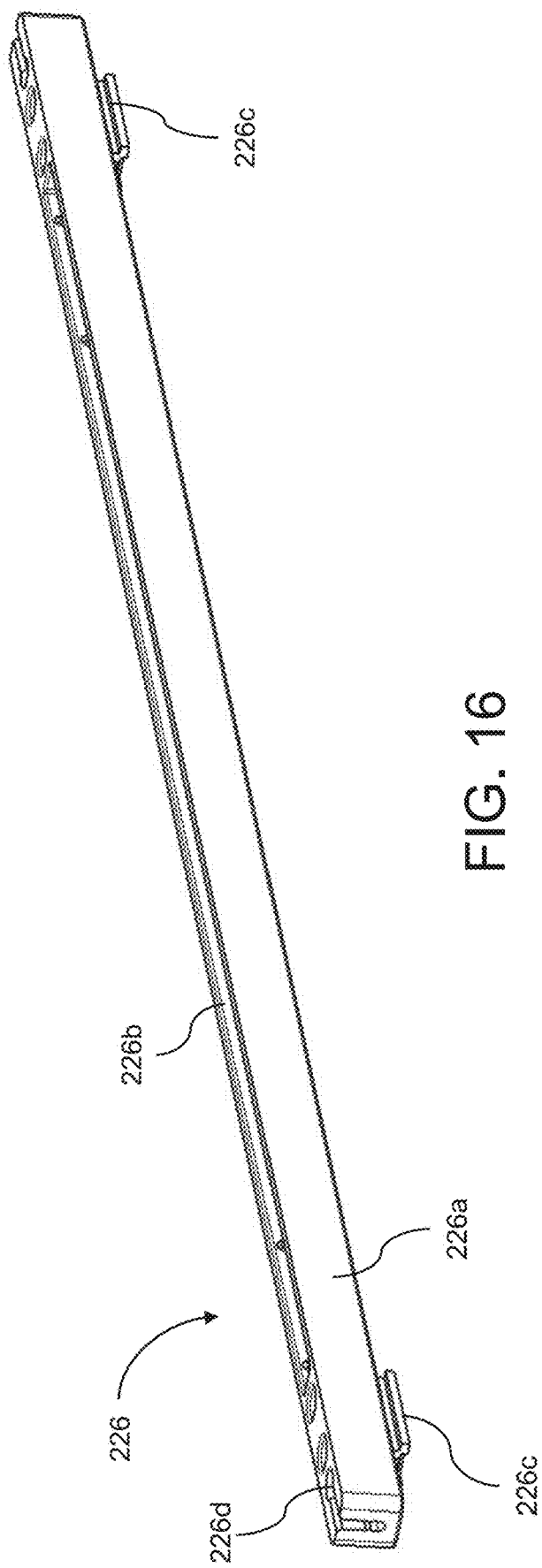
FIG. 16 is a perspective view of the carriage element of the rear slider window assembly of FIG. 14.
Figure 17:
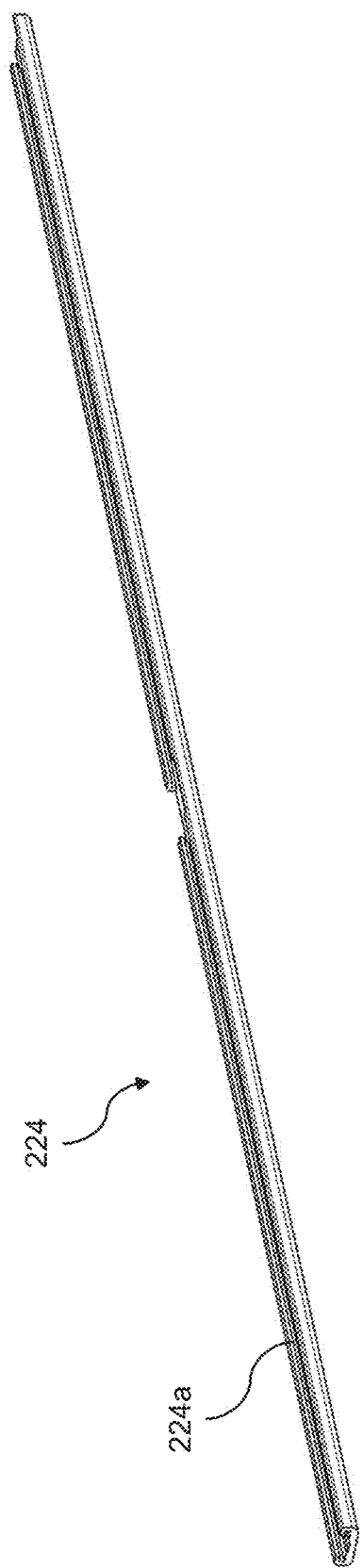
FIG. 17 is a perspective view of the guide of the rear slider window assembly of FIG. 14.

Feet or wings or tabs 226c extend from a lower portion of the body 226a of the carriage 226 and are slidably received within the track 224a of the guide element 224. For example, the wings 226c may be attached to the lower portion of the carriage 226, such as adhesively attached and/or via threaded fasteners, or the wings 226c may be integrally formed with the body 226a. The wings 226c may extend below the body 226a so that, when received in the track 224a of the guide element 224, a gap or clearance is provided between the body 226a and the guide element 224 between respective wings 226c (FIG. 14B). Sets of wings 226c may be spaced along the carriage 226, such as at opposing ends of the carriage 226 (FIG. 16).

With the carriage 226 attached along the lower edge region of the movable window panel 220 and the wings 226c slidably received along the track 224a of the guide element 224, the carriage 226 and movable window panel 220 are movable along the guide element 224 to move the movable window panel 220 along the window frame 214. As shown in FIG. 16, each end of the carriage 226 has a cable-receiving portion 226d for receiving a respective end of a cable of a cable drive system that operates to move the movable window panel between the opened position and the closed position. The wings 226c extending along opposing sides of the carriage 226 prevent or preclude the carriage 226 from tilting or pivoting relative to the guide element 224.

Optionally, the guide element may be suspended along the lower rail of the frame, with the carriage riding along the suspended guide element as the movable window panel moves between the closed position and the opened position. For example, and as shown in FIGS. 18-21, a window assembly 310 includes a window frame 314 having an upper rail 314a and a lower rail 314b, with the window frame 314 attached to a fixed window panel 316. An aperture or opening is formed between opposing sides or portions of the fixed window panel 316. A movable window panel 320 is supported by the window frame 314 and movable along the frame 314 relative to the opening and the fixed window panel 316 between a closed position and an opened position. The movable window panel 320 is movable between the closed position and the opened position via operation of a slider bearing track system 322.

Figure 18:
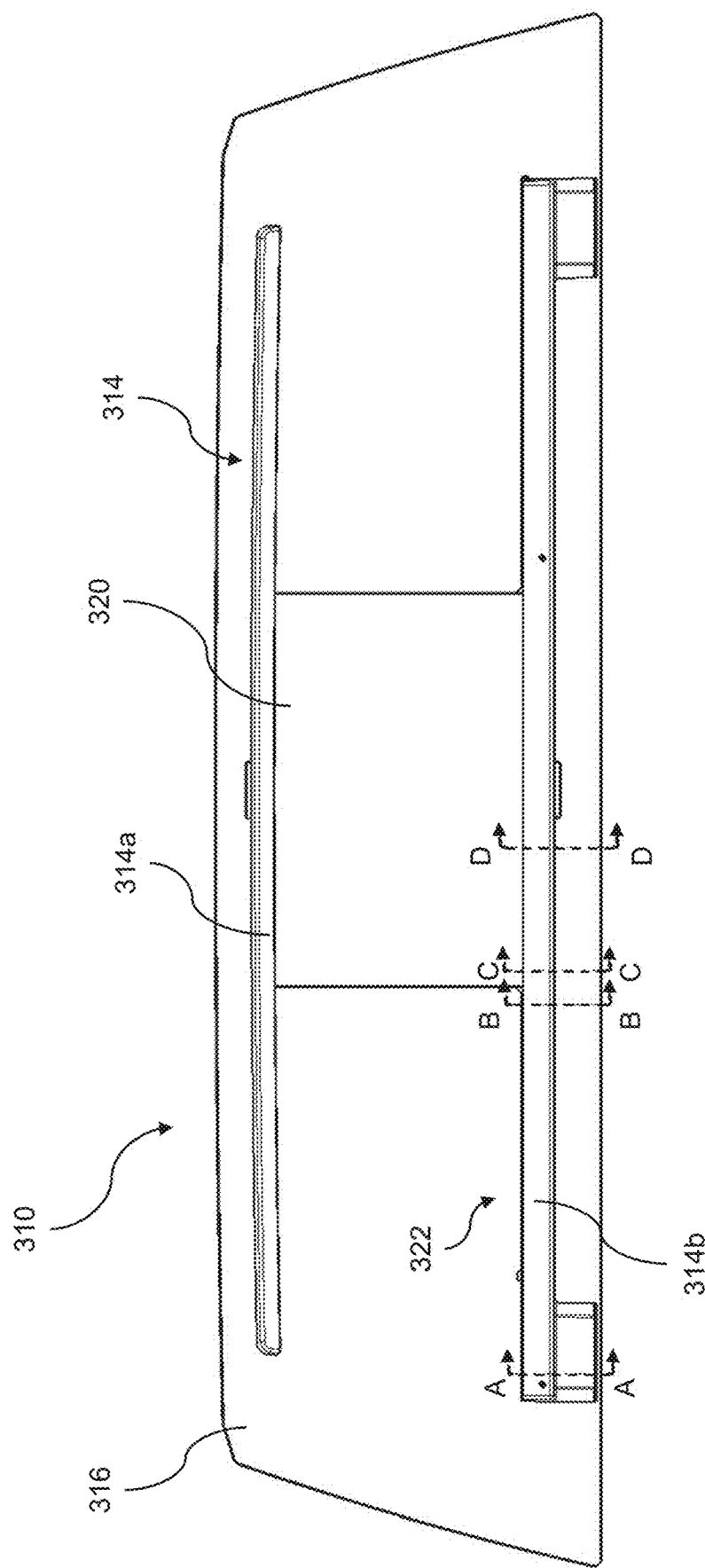
FIG. 18 is a plan view of another rear slider window assembly.
Figure 18A:
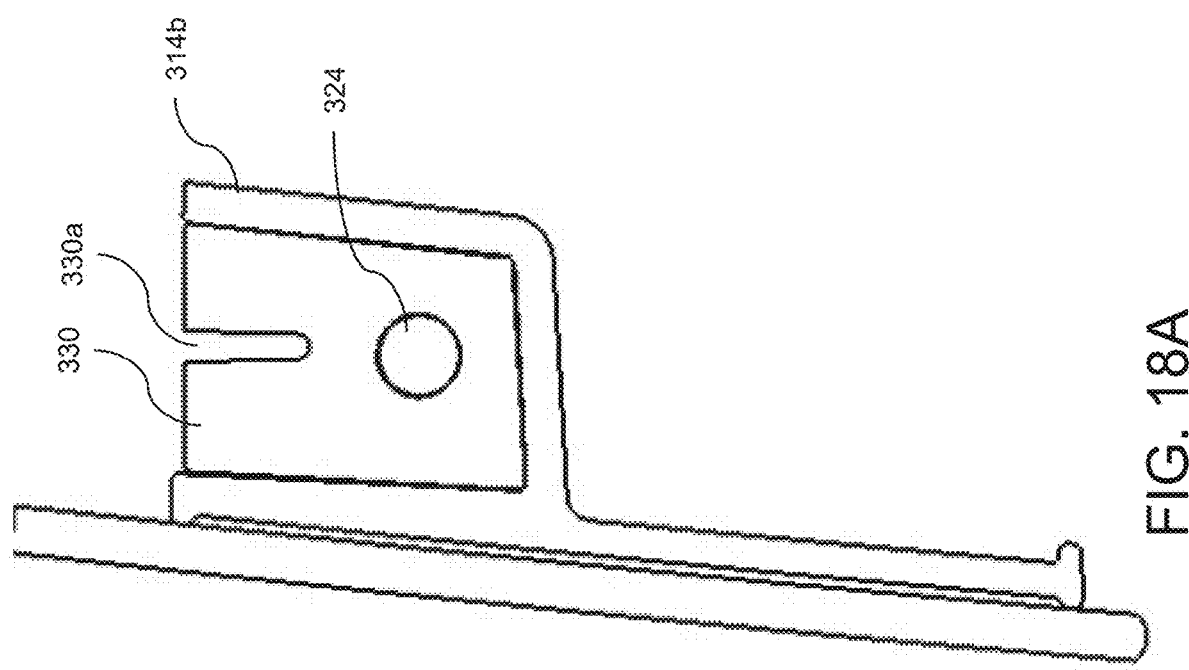
FIG. 18A is a sectional view of a portion of the rear slider window assembly taken along the line A-A in FIG. 18.

As shown in FIGS. 18A-18D, an elongated guide element 324 of the slider bearing track system 322 is disposed within a channel of the lower rail 314b and extends along a portion of the lower rail 314b corresponding at least to the range of motion of the movable window panel 320. In the illustrated example, the guide element 324 includes a rod suspended along the channel of the lower rail 314b. That is, opposing ends of the rod are supported or anchored relative to the lower rail 314b with the portion of the rod between the opposing ends extending along the lower rail 314b and spaced from the sides and lower surface of the lower rail 314b (FIG. 18D). The opposing ends of the rod are supported by respective stops 330 disposed within the channel of the lower rail 314b (FIG. 18A). For example, the stops 330 may be adhesively attached and/or friction fit into the channel to secure the stops 330 relative to the lower rail 314b. Optionally, the stops 330 may be integrally formed with the lower rail 314b.

Figure 18C:
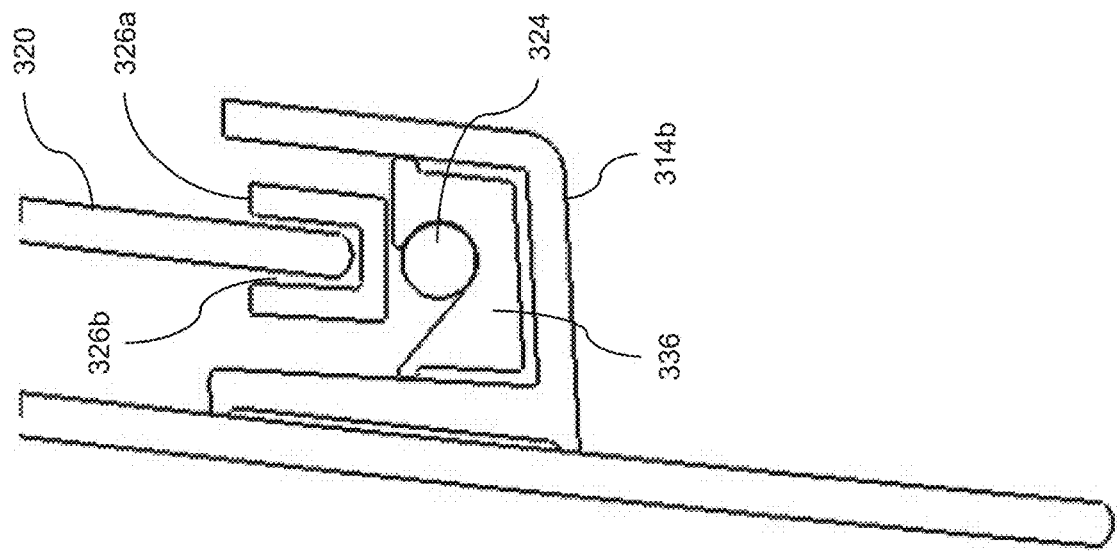
FIG. 18C is a sectional view of a portion of the rear slider window assembly taken along the line C-C in FIG. 18.
Figure 19:
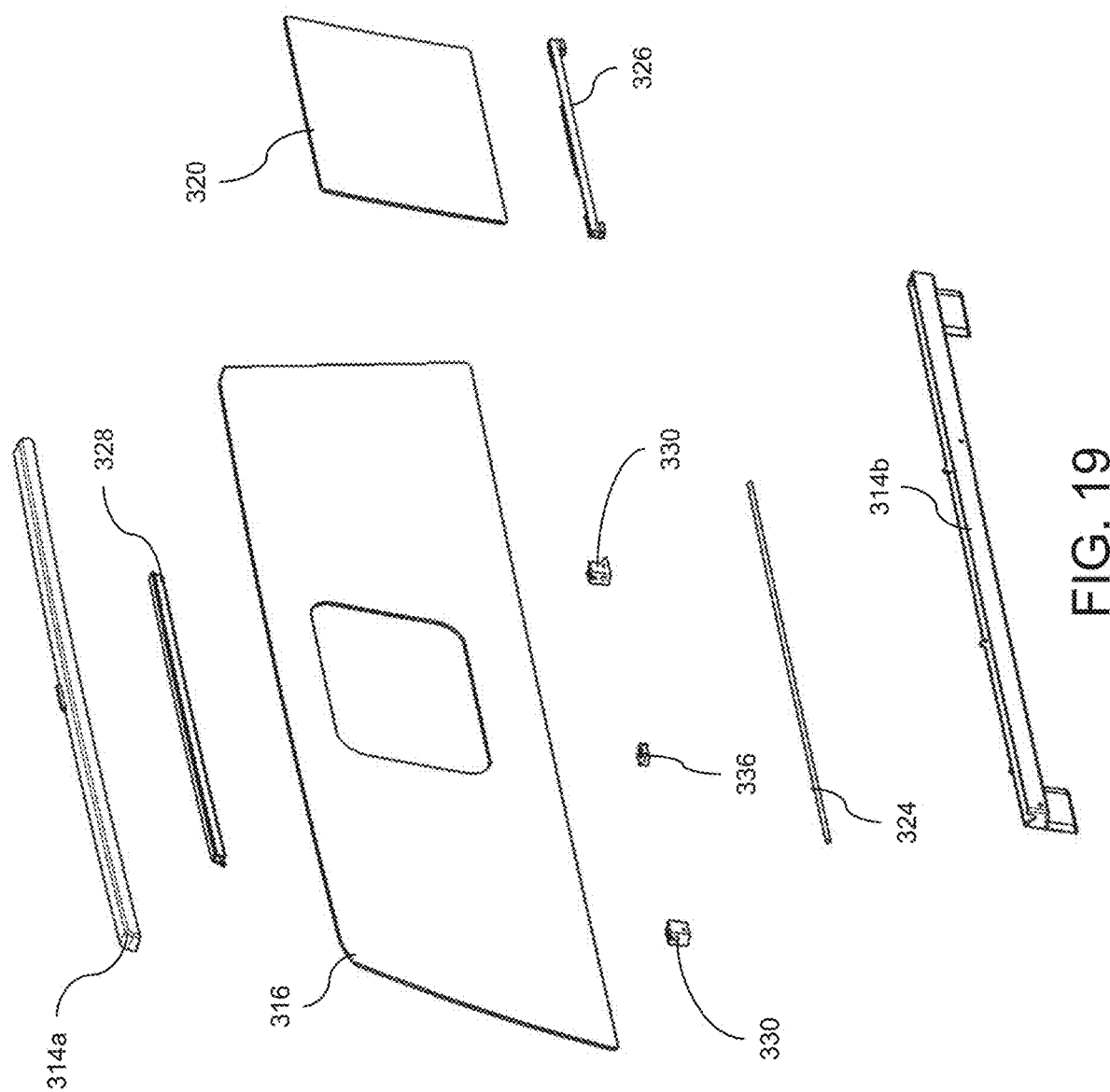
FIG. 19 is an exploded perspective view of the rear slider window assembly of FIG. 18.

Moreover, one or more intermediate support elements 336 may be disposed within the channel of the lower rail 314b for supporting the rod at respective positions between the stops 330 (FIG. 18C). In other words, the intermediate support element 336 is secured relative to the lower rail 314b (e.g., adhesively attached and/or friction fit into the channel) and receives the rod within a channel or recess 336a to provide additional support and stability along the length of the rod. Thus, when a carriage element 326 attached to the movable window panel 320 is disposed at the guide element 324, the weight of the carriage 326 and movable window panel 320 may be transferred along the rod through the stops 330 and the intermediate support element 336 to the lower rail 314b. The intermediate support element 336 may resist bending of the rod.

The carriage element 326 is disposed along a lower perimeter edge region of the movable window panel 320 and is configured to ride along the guide element 324 to enable movement of the movable window panel 320 between the closed position and the opened position. An upper seal or rail portion 328 may be disposed along an upper perimeter edge region of the movable window panel 320 and disposed within the upper rail 314a of the window frame 314.

Figure 20:
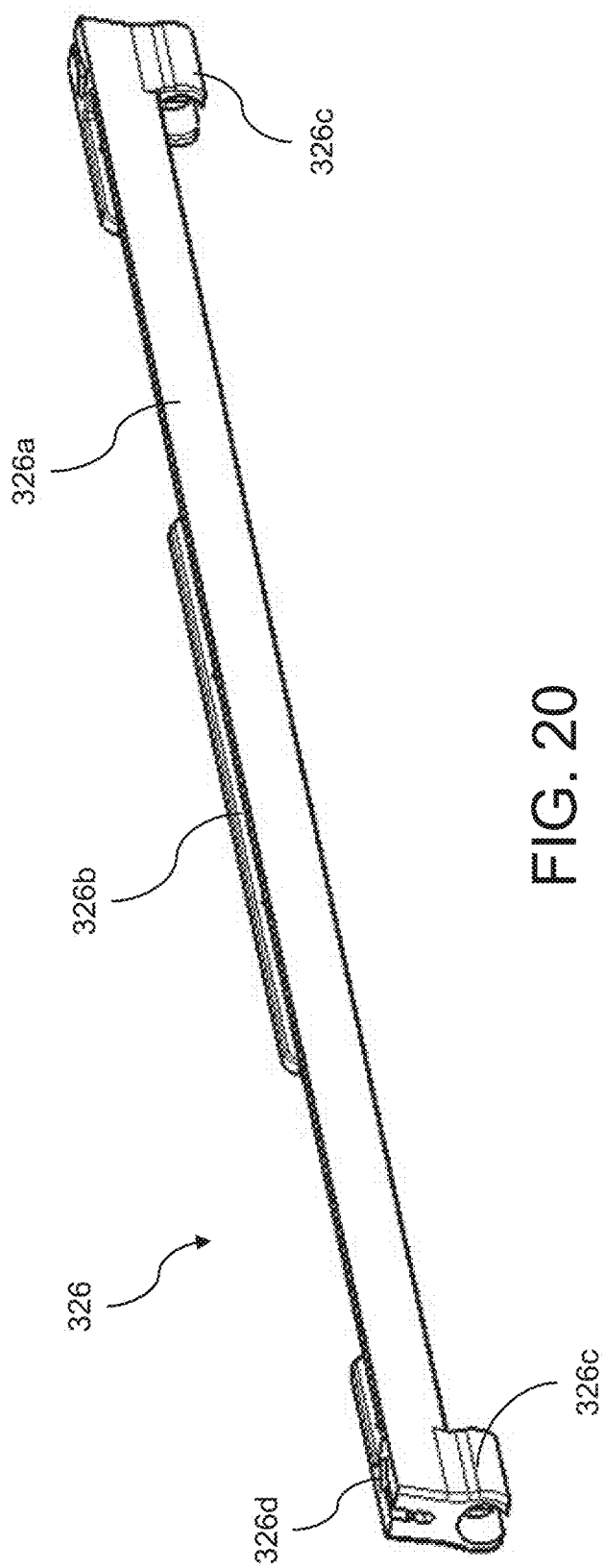
FIG. 20 is a perspective view of the carriage element of the rear slider window assembly of FIG. 18.
Figure 21:
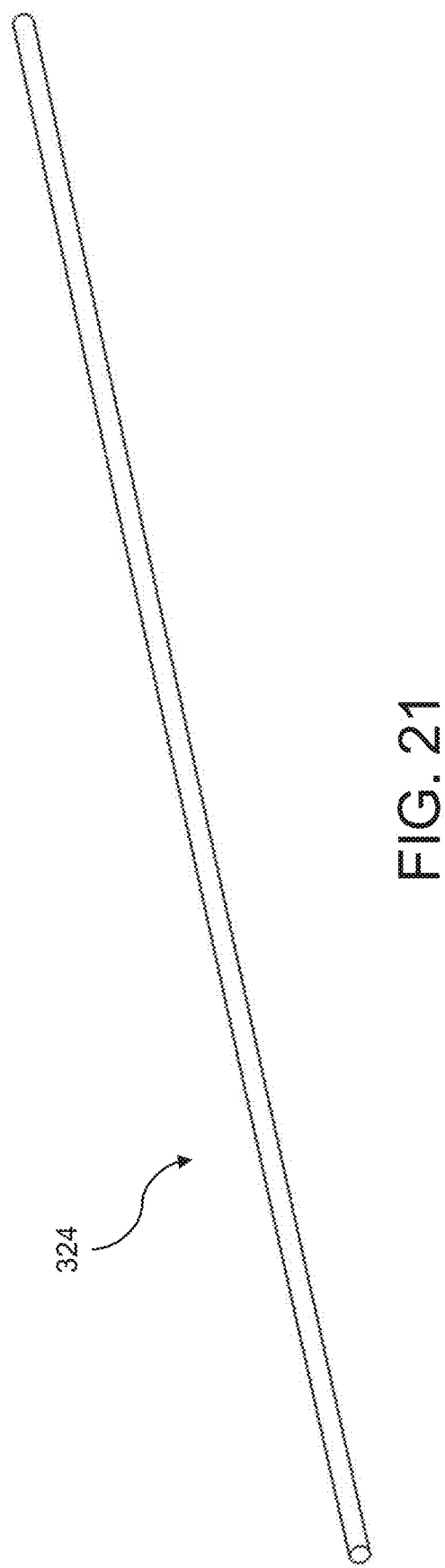
FIG. 21 is a perspective view of the guide of the rear slider window assembly of FIG. 18.

The carriage element 326 includes a body portion 326a that includes a recess or slot 326b at an upper portion of the body configured to receive and attach to the movable window panel 320 (FIG. 20). A lower portion of the body 326a includes guide receiving portions 326c configured to slidably receive the guide element 324. In the illustrated example, the guide receiving portion 326c includes a rounded or at least partially cylindrical channel or passageway that receives the rod. The guide receiving portion 326c includes a low-friction material or coating (and the rod may also or otherwise include a low-friction material or coating) to enable movement of the carriage 326 and the movable window panel 320 along the guide element 324 and lower rail 314b. Further, the guide receiving portion 326c includes an opening or slot at a lower portion of the cylindrical channel that may allow the carriage 326 to be snap attached to and/or removed from the guide element 324. The guide receiving portion 326c may include recesses or indentations along the channel to prevent the guide element 324 from sticking to the inner surfaces of the guide receiving portion 326c (FIG. 18B). As shown in FIGS. 18B and 18C, a gap may be disposed between the guide element 324 and the portion of the body 326a having the window receiving recess 326b. Further, the guide receiving portions 326c may be disposed at opposing ends of the carriage 326 so that, during movement of the movable window panel 320 between the closed position and the opened position, the body portion 326a of the carriage 326 passes over the intermediate support element 336 and the intermediate support element 336 does not interfere with movement of the carriage 326 and movable window panel 320 (such as by contacting the guide receiving portions 326c).

Thus, with the carriage 326 attached along the lower edge region of the movable window panel 320 and the rod received along the guide receiving portion 326c of the carriage 326, the carriage 326 is movable along the guide element 324 to move the movable window panel 320 between the closed position and the opened position. For example, a cable drive system may operate to move the movable window panel 320 with ends of a cable received within receiving portions 326d of the carriage 326 (FIG. 20). The stops 330 may include a cable receiving portion 330a for receiving and guiding the cable of the cable drive system (FIG. 18A).

The movable or slider window panel may be movable such as via manual pushing or pulling at the window panel or in response to actuation of an electrically-powered drive motor of a drive motor assembly or system, which may move cables or the like to impart horizontal movement of the slider window panel along the rails. Optionally, a power drive system may operate to pull the movable window panel in either direction along the upper and lower channels via respective cables. Optionally, the power drive system and drive motor assembly may utilize aspects of the drive assemblies of the types described in U.S. Pat. Nos. 4,920,698; 4,995,195; 5,146,712; 5,531,046; 5,572,376; 6,119,401; 6,955,009; 7,073,293 and/or 10,501,977, and/or U.S. Publication Nos. US-2019-0383084; US-2008-0127563 and/or US-2004-0020131, which are all hereby incorporated herein by reference in their entireties.

Optionally, the window panels (including the movable window panel) may include heater grids for heating or defogging or defrosting of the window panels. The heater grid of the movable window panel may be electrically powered in a manner that allows for heating or defogging or defrosting of the movable window panel irrespective of whether the movable window panel is opened or partially opened or closed. The heater grids (and heating connections at the fixed and movable window panels) may utilize aspects of the rear slider window assemblies described in U.S. Pat. Nos. 9,579,955; 8,881,458 and/or 8,402,695, and/or U.S. Publication Nos. US-2023-0084191 and/or US-2022-0295603, which are all hereby incorporated herein by reference in their entireties.

The window assembly includes two fixed window panels that are spaced apart so as to define an opening therebetween. The slider or movable window panel is movable along the lower rail and the upper rail of the frame portion to open and close the opening. The two fixed window panels may comprise two separate panels with upper and lower appliques disposed above and below the aperture, or the two fixed window panels may be part of a single hole-in-glass window panel with the aperture formed therethrough.

Optionally, the window assembly or assemblies may utilize aspects of the window assemblies described in U.S. Pat. Nos. 11,331,984; 10,501,977; 8,938,914; 8,915,018; 8,881,458; 8,402,695; 8,322,073; 7,838,115; 7,332,225; 7,073,293; 7,003,916; 6,846,039; 6,691,464; 6,319,344; 6,068,719; 5,853,895 and/or 5,799,444, and/or U.S. Publication Nos. US-2021-0355737; US-2014-0047772; US-2013-0174488; US-2011-0056140; US-2006-0107600; US-2008-0127563; US-2004-0020131 and/or US-2003-0213179, which are hereby incorporated herein by reference in their entireties.

Although shown and described as a rear slider window assembly, such as for a pickup truck, aspects of the rear slider window assembly are suitable for use on other vehicular window assemblies, such as side or rear window assemblies with openable window panels.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear slider window assembly, the vehicular rear slider window assembly comprising:
a fixed window panel;
a movable window panel;
an upper rail and a lower rail attached to the fixed window panel;
wherein the vehicular rear slider window assembly comprises an opening, and wherein the movable window panel is movable along the upper rail and the lower rail between (i) a closed position where the movable window panel is disposed at the opening and (ii) an opened position where the movable window panel is disposed at least partially along the fixed window panel;
a slider bearing system comprising (i) a guide element disposed at least partially along the lower rail and (il) a carriage disposed at a lower perimeter region of the movable window panel;
wherein the carriage comprises a window panel receiving channel at an upper portion of the carriage, and wherein the window panel receiving channel receives and attaches at the lower perimeter region of the movable window panel; and
wherein the guide element comprises a bearing element that is slidably and non-rotatably received at a bearing receiving portion of the carriage, and wherein the bearing receiving portion is at a lower portion of the carriage that is opposite the window panel receiving channel at the upper portion of the carriage, and wherein the carriage moves in a direction parallel to a longitudinal axis of the bearing element when the movable window panel moves between the closed position and the opened position; and wherein the guide element comprises a base portion that is adhesively attached at a lower wall of the lower rail, and wherein the bearing element protrudes upwardly from the base portion.

2. The vehicular rear slider window assembly of claim 1, wherein the bearing receiving portion of the carriage comprises a self-lubricating plastic material.

3. The vehicular rear slider window assembly of claim 1, wherein the bearing element of the guide element comprises a self-lubricating plastic material.

4. The vehicular rear slider window assembly of claim 1, wherein the bearing element of the guide element and the bearing receiving portion of the carriage both comprise a self-lubricating plastic material.

5. The vehicular rear slider window assembly of claim 1, wherein the slider bearing system comprises at least two carriages spaced apart along the lower perimeter region of the movable window panel.

6. The vehicular rear slider window assembly of claim 5, wherein the at least two carriages move in the direction parallel to the longitudinal axis of the bearing element when the movable window panel moves between the closed position and the opened position.

7. The vehicular rear slider window assembly of claim 1, wherein the bearing receiving portion of the carriage is attached at a lower end portion of a body portion of the carriage.

8. The vehicular rear slider window assembly of claim 1, wherein the bearing receiving portion of the carriage comprises a self-lubricating plastic material, and wherein the guide element comprises a polymeric material that is different from the self-lubricating plastic material of the bearing receiving portion.

9. The vehicular rear slider window assembly of claim 1, wherein a shape of a cross-section of the bearing receiving portion corresponds to a shape of a cross-section of the bearing element.

10. The vehicular rear slider window assembly of claim 9, wherein the respective shapes of the cross-section of the bearing receiving portion and the bearing element comprise polygonal shapes.

11. The vehicular rear slider window assembly of claim 9, wherein the respective shapes of the cross-section of the bearing receiving portion and the bearing element comprise rounded shapes.

12. The vehicular rear slider window assembly of claim 1, wherein the fixed window panel comprises a single glass panel having the opening therethrough.

13. The vehicular rear slider window assembly of claim 1, wherein the fixed window panel comprises two fixed glass panels with the opening between the two fixed glass panels.

14. A vehicular rear slider window assembly, the vehicular rear slider window assembly comprising:
   a fixed window panel;
   a movable window panel;
   an upper rail and a lower rail attached to the fixed window panel;
   wherein the vehicular rear slider window assembly comprises an opening, and wherein the movable window panel is movable along the upper rail and the lower rail between (i) a closed position where the movable window panel is disposed at the opening and (ii) an opened position where the movable window panel is disposed at least partially along the fixed window panel;
   a slider bearing system comprising (i) a track element disposed at least partially along the lower rail and (ii) a carriage disposed at a lower perimeter region of the movable window panel;
   wherein the carriage comprises a window panel receiving channel at an upper portion of the carriage, and wherein the window panel receiving channel receives and attaches at the lower perimeter region of the movable window panel; and
   wherein the carriage comprises a guide portion that is slidably and non-rotatably received at a guide receiving portion of the track element, and wherein the guide portion extends from a lower portion of the carriage that is opposite the window panel receiving channel at the upper portion of the carriage, and wherein the carriage moves in a direction parallel to a longitudinal axis of the track element when the movable window panel moves between the closed position and the opened position; and wherein the track element comprises a base portion that is adhesively attached at a lower wall of the lower rail, and wherein the guide receiving portion extends upwardly from the base portion.

15. The vehicular rear slider window assembly of claim 14, wherein the guide receiving portion of the track element comprises a self-lubricating plastic material.

16. The vehicular rear slider window assembly of claim 14, wherein the guide portion of the carriage comprises a self-lubricating plastic material.

17. The vehicular rear slider window assembly of claim 14, wherein the guide portion of the carriage and the guide receiving portion of the track element both comprise a self-lubricating plastic material.

\* \* \* \* \*